(12) United States Patent
Maraveyas

(10) Patent No.: US 12,309,128 B2
(45) Date of Patent: May 20, 2025

(54) AUXILIARY DEVICE FOR AN ELECTRONIC COMMUNICATION DEVICE

(71) Applicant: George Maraveyas, Beverley (GB)

(72) Inventor: George Maraveyas, Beverley (GB)

( * ) Notice: Subject to any disclaimer, the term of this patent is extended or adjusted under 35 U.S.C. 154(b) by 193 days.

(21) Appl. No.: 18/190,755

(22) Filed: Mar. 27, 2023

(65) Prior Publication Data

US 2023/0308423 A1    Sep. 28, 2023

(30) Foreign Application Priority Data

Mar. 28, 2022  (GB) ..................................... 2204392

(51) Int. Cl.
*H04L 9/40* (2022.01)
*H04W 12/03* (2021.01)

(52) U.S. Cl.
CPC ......... *H04L 63/0428* (2013.01); *H04W 12/03* (2021.01)

(58) Field of Classification Search
CPC ............................ H04L 63/0428; H04W 12/03
See application file for complete search history.

(56) References Cited

U.S. PATENT DOCUMENTS

| | | | |
|---|---|---|---|
| 8,264,310 B2* | 9/2012 | Lauder | G06F 1/1675 361/679.01 |
| 10,671,179 B2* | 6/2020 | Xia | G06F 3/03547 |
| 10,798,836 B2* | 10/2020 | Manuel | E05B 65/0067 |
| 11,561,525 B2* | 1/2023 | Tart | G05B 19/4185 |
| 2013/0067534 A1 | 3/2013 | Soffer et al. | |
| 2014/0342669 A1 | 11/2014 | Zeung et al. | |
| 2017/0063531 A1 | 3/2017 | Sullivan | |
| 2018/0210560 A1 | 7/2018 | Xia et al. | |
| 2018/0316272 A1 | 11/2018 | Yu et al. | |
| 2021/0409533 A1* | 12/2021 | Kim | E05D 11/1028 |

FOREIGN PATENT DOCUMENTS

| | | |
|---|---|---|
| EP | 2905698 A | 8/2015 |
| EP | 3817348 A1 | 5/2021 |
| KR | 20140042365 B1 | 4/2014 |
| WO | 2013166278 A1 | 11/2013 |
| WO | 2013183010 A1 | 12/2013 |

* cited by examiner

*Primary Examiner* — Chau Le
(74) *Attorney, Agent, or Firm* — EIP US LLP

(57) ABSTRACT

Disclosed is an auxiliary device for an electronic communication device. The auxiliary device comprises an input domain comprising an input module for entry of data; a processor for processing input data; and an encryption module configured to encrypt received data; and an output domain comprising an output module for outputting data; a processor for processing output data; and a decryption module configured to decrypt received data. The auxiliary device comprises a transmit domain configured to communicate encrypted data received from the input domain to the electronic communication device via a first unidirectional data module, and a receive domain configured to communicate encrypted data received from the electronic communication device to the output domain via a second unidirectional data module. The first and second unidirectional data modules prevent data communication in the respective reverse directions.

20 Claims, 22 Drawing Sheets

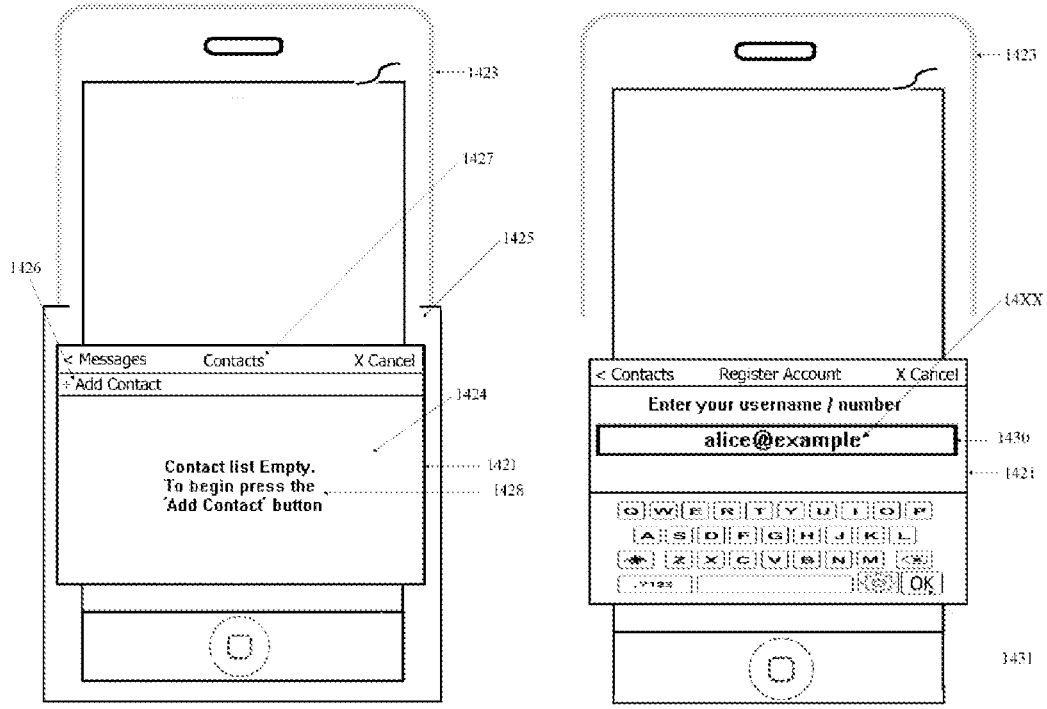
Fig. 9A
Fig. 9B
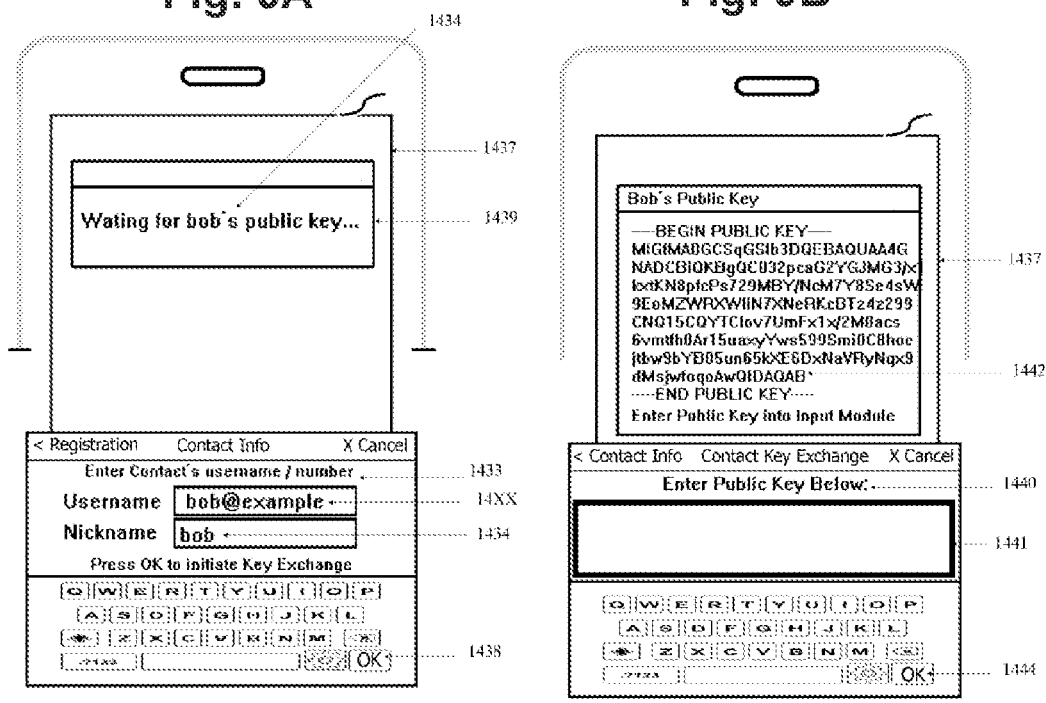
Fig. 9C
Fig. 9D

AUXILIARY DEVICE FOR AN ELECTRONIC COMMUNICATION DEVICE

CROSS-REFERENCE TO RELATED APPLICATIONS

This application claims priority to GB Application No. GB 2204392.1, filed Mar. 28, 2022, under 35 U.S.C. § 119(a). The above-referenced patent application is incorporated by reference in its entirety.

BACKGROUND

Technical Field

The present invention relates to an auxiliary device to be used with an electronic communication device. The auxiliary device provides a secure infrastructure outside of the electronic communication device in which sensitive data can be processed.

Background

Communication devices store, transmit and receive vast amounts of sensitive and confidential information. Such data can range from private messages and digital media shared between individual users to banking details, securities transactions and digital asset holdings. Current methods of securing data on electronic devices and in transit between devices are multifaceted. Data stored on a device can be secured using disk encryption, which prevents unauthenticated data recovery. Data transiting between devices can be secured using end-to-end encryption, in which no intermediary is required to keep the data secure in transmission, or through Public Key Infrastructure (PKI) cryptography combined with Certificate Authorities. The latter method accounts for a large amount of the data secured between communication devices and web servers.

A weakness of current cryptographic security measures, however, is the assumption that the communication device receiving or transmitting the sensitive data in question is secure. A mobile cell phone, for instance, even if running the most up-to-date version of its operating system, is still vulnerable to previously undiscovered attack vectors and vulnerabilities that have not yet been patched. An attacker who gains control of a communication device effectively bypasses any form of encryption deployed by the device without the need to defeat it. This problem is compounded by the fast-paced nature of the communications industry. With device manufacturers relying on just-in-time techniques to source components from multiple vendors and with software developers pushed to include the latest features with every iteration, device complexities emerge which greatly increase the likelihood of new vulnerabilities.

SUMMARY

According to a first aspect of the present invention, there is provided an auxiliary device for an electronic communication device, the auxiliary device comprising an input domain, a transmit domain, a receive domain and an output domain The input domain comprises an input module for entry of data by the user of the auxiliary device, a processor for processing said data and an encryption module configured to encrypt said data. The transmit domain is configured to receive encrypted data from the input domain via a first unidirectional data module, which prevents data communication from the transmit domain to the input domain, and transmit this encrypted data to the electronic communication device. The receive domain is configured to receive data from the electronic communication device and transmit this to the output domain via a second unidirectional data module, which prevents data communication from the output domain to the receive domain. The output domain comprises a processor for processing received data, a decryption module configured to decrypt said received data and an output module for outputting data to the user of the auxiliary device. In this way, the auxiliary device isolates user input data from the associated communication device.

In embodiments, a secure communication channel is provided to propagate the encrypted user input onto additional communication devices. The auxiliary device can receive and decrypt data received via the secure communication channel and display the decrypted data on a touch display module forming part of the auxiliary device isolated from the communication device.

In examples, the unidirectional data modules comprise optocouplers.

In examples, the unidirectional data modules comprise a data input, a data output and a controller programmed to permit data transfer through the unidirectional data module from the data input to the data output and to forbid data transfer through the unidirectional data module from the data output to the data input In examples, the input and/or output modules are implemented by a transparent touch display module.

In examples, the encryption and decryption modules are implemented by a hardware security module.

In examples, the transmit and/or receive domains comprise a wireless transceiver in communication with the electronic communication device and/or a wired connection to the electronic communication device.

In examples, the wired connection of the transmit and/or receive domain is via a flexible printed circuit, USB or lightning port connection.

In examples, the wireless transceiver of the transmit and/or receive domain is configured to communicate using Bluetooth, Wi-Fi, IrDA, or NFC.

In examples, the input module comprises an optical device capable of optically receiving information. The optical device may be positioned on the underside of the input module such that it can capture the display of the output module.

In examples, the auxiliary device comprises a noise generator. The noise generator may be configured to generate ultrasonic noise in the range of 19 kHz-25 kHz.

In examples, the auxiliary device features a bypass mechanism interposed between the input domain and output domain, having a user interface allowing a user to redirect data received at the input domain directly to the output domain, bypassing the electronic communication device. In examples, such a bypass mechanism's user interface is a spring-loaded switch. Alternatively, a switch may be implemented in software.

In examples, the input module is mounted onto a hinged support unit such that it can be stowed whilst not in use and rotated into proximity with the screen of the electronic communication device for usage.

In examples, the input module is housed in a cylindrical retraction unit such that it can be stowed whilst not in use and unrolled for usage, wherein the cylindrical retraction unit is housed within the body of the auxiliary device.

In examples, the electronic communication device is a smartphone.

According to a second aspect of the present invention, there is provided a system comprising an auxiliary device and an electronic communication device, the auxiliary device comprising an input domain, a transmit domain, a receive domain and an output domain The input domain comprises an input module for entry of data by the user of the auxiliary device, a processor for processing said data and an encryption module configured to encrypt said data. The transmit domain is configured to receive encrypted data from the input domain via a first unidirectional data module, which prevents data communication from the transmit domain to the input domain, and transmit this encrypted data to the electronic communication device. The receive domain is configured to receive data from the electronic communication device and transmit this to the output domain via a second unidirectional data module, which prevents data communication from the output domain to the receive domain. The output domain comprises a processor for processing received data, a decryption module configured to decrypt said received data and an output module for outputting data to the user of the auxiliary device. In this way, the auxiliary device isolates user input data from the associated communication device. In examples, the electronic communication device is a smartphone.

Further features and advantages of the invention will become apparent from the following description of preferred embodiments of the invention, given by way of example only, which is made with reference to the accompanying drawings.

BRIEF DESCRIPTION OF THE DRAWINGS

FIG. 9A depicts schematically an exemplary auxiliary device's display during a stage of a key exchange process.

FIG. 9B depicts schematically an exemplary auxiliary device's display during a stage of a key exchange process.

FIG. 9C depicts schematically an exemplary auxiliary device's display during a stage of a key exchange process.

FIG. 9D depicts schematically an exemplary auxiliary device's display during stages of a key exchange process.

FIG. 16Cb illustrates schematically the exemplary auxiliary device of 16Ca where the retaining connector mechanism is physically coupled with elevated retaining sidewall.

DETAILED DESCRIPTION

Overview

Figure 1:
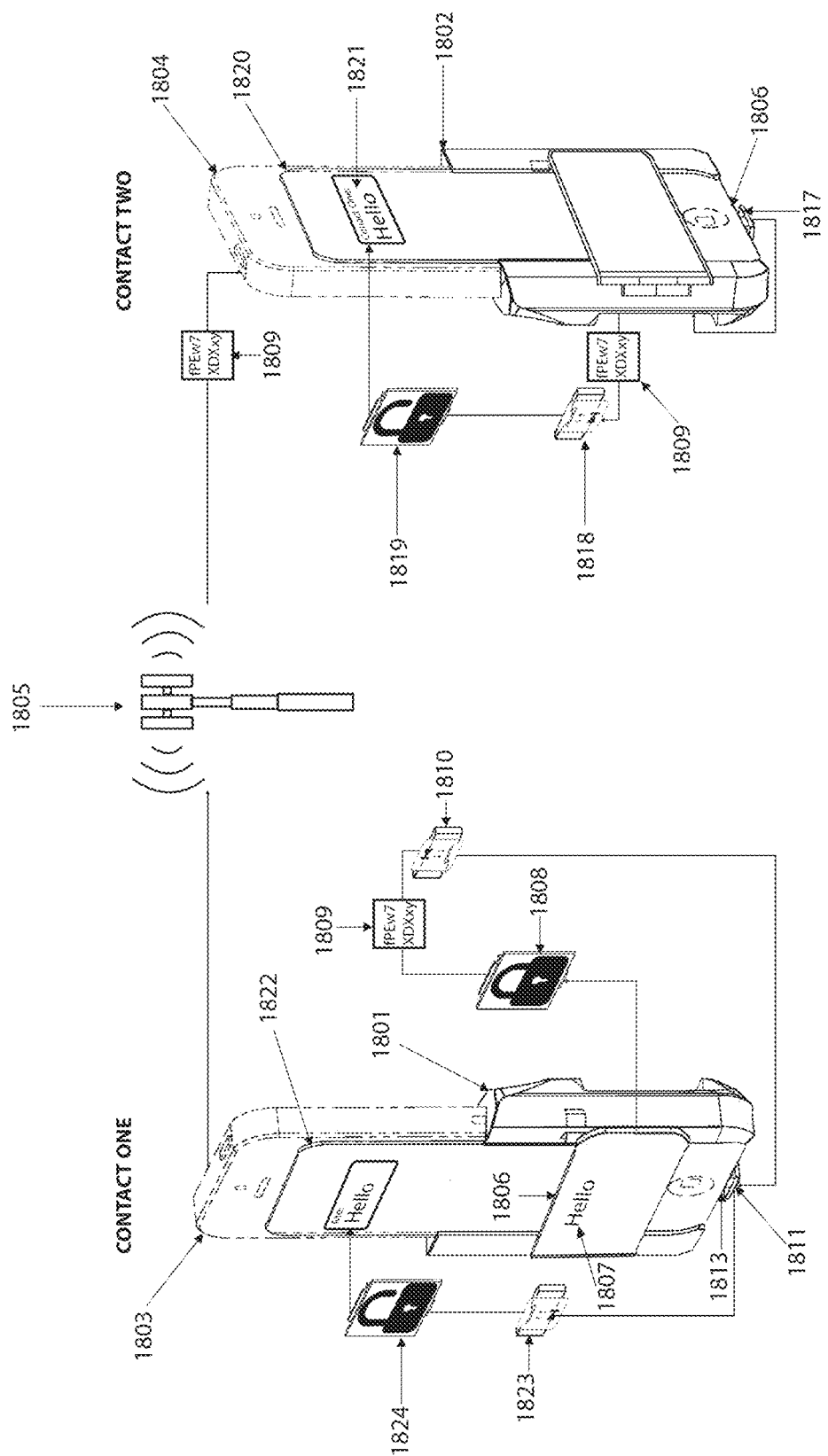
FIG. 1 is a schematic view of two separate electronic communication devices in communication with one another, each one equipped with an exemplary auxiliary device according to an embodiment of the invention.

FIG. 1 illustrates an overview example of two separate contacts and their respective auxiliary devices 1801, 1802, connected to their respective communication devices 1803, 1804, and interacting by communicating with each other over a communication network 1805, such as the internet. Illustrated is the first auxiliary device 1801 connected to the first communication device 1803, and the message being entered into the input module 1806 of the first auxiliary device 1801 of 'Contact #1' for transmission the second contact, 'Contact #2'. While in draft on the input module 1806 the message 1807 exists as cleartext message data. If sent, the cleartext message data 1807 is encrypted by the input module's 1806 encryption module 1808 creating ciphertext message data 1809. The message ciphertext subsequently passes through the unidirectional data module 1810 of the auxiliary device 1801 and via the auxiliary device connector 1811.

Contact #1's auxiliary device data connector 1811, being connected to the data socket 1813 of Contact #1's communication device 1803 further transmits the ciphertext data message 1809 to said communication device 1803, whereupon the counterpart application 1814 (See FIG. 3) installed on Contact #1's communication device 1803 processes and conduits the ciphertext message data 1809 to its destination (Contact #2) by utilising the communication device's 1803 connectivity capabilities (e.g. WiFi, cellular data, Bluetooth, NFC etc.) to connect to a communications network 1805 (such as the internet) to transmit the ciphertext message data 1809 to Contact #2's communication device 1804.

The ciphertext message data 1809 also needs to be transmitted to contact #1's transparent touch display module (TTDM) 1822 to populate the conversation chat window. Thus, upon receipt by said counterpart application 1814 residing on contact #1's communication device 1803, a copy of the ciphertext message data 1809 is transmitted by said counterpart application 1814 via the communication device's data socket 1813 to contact #1's auxiliary device. The decryption module 1824 then decrypts the ciphertext message data 1809 for display as plaintext message data 1806 on the TTDM 1822 of the auxiliary device 1801. The auxiliary device is configured to only receive data in this explicitly unidirectional fashion.

Contact #2's communication device 1804, upon receipt of the ciphertext message data 1809 from contact #1's communication device 1803, proceeds to initiate the counterpart application 1815 installed on said contact #2's communication device 1804. On receipt of said data, contact #2's counterpart application 1815 acts to transmit the ciphertext message data 1809 to their auxiliary device 1802 via the communication device's data socket 1816 attached to the auxiliary device's 1802 data connector 1817. The auxiliary device 1802 upon receiving (any) data via the receiving unidirectional data module 1818, in this example, incoming ciphertext message data 1809, further transmits said data to the decryption module 1819 which, upon decryption, is displayed on the TTDM 1820 of the auxiliary device as decrypted ciphertext 1821.

Figure 2:
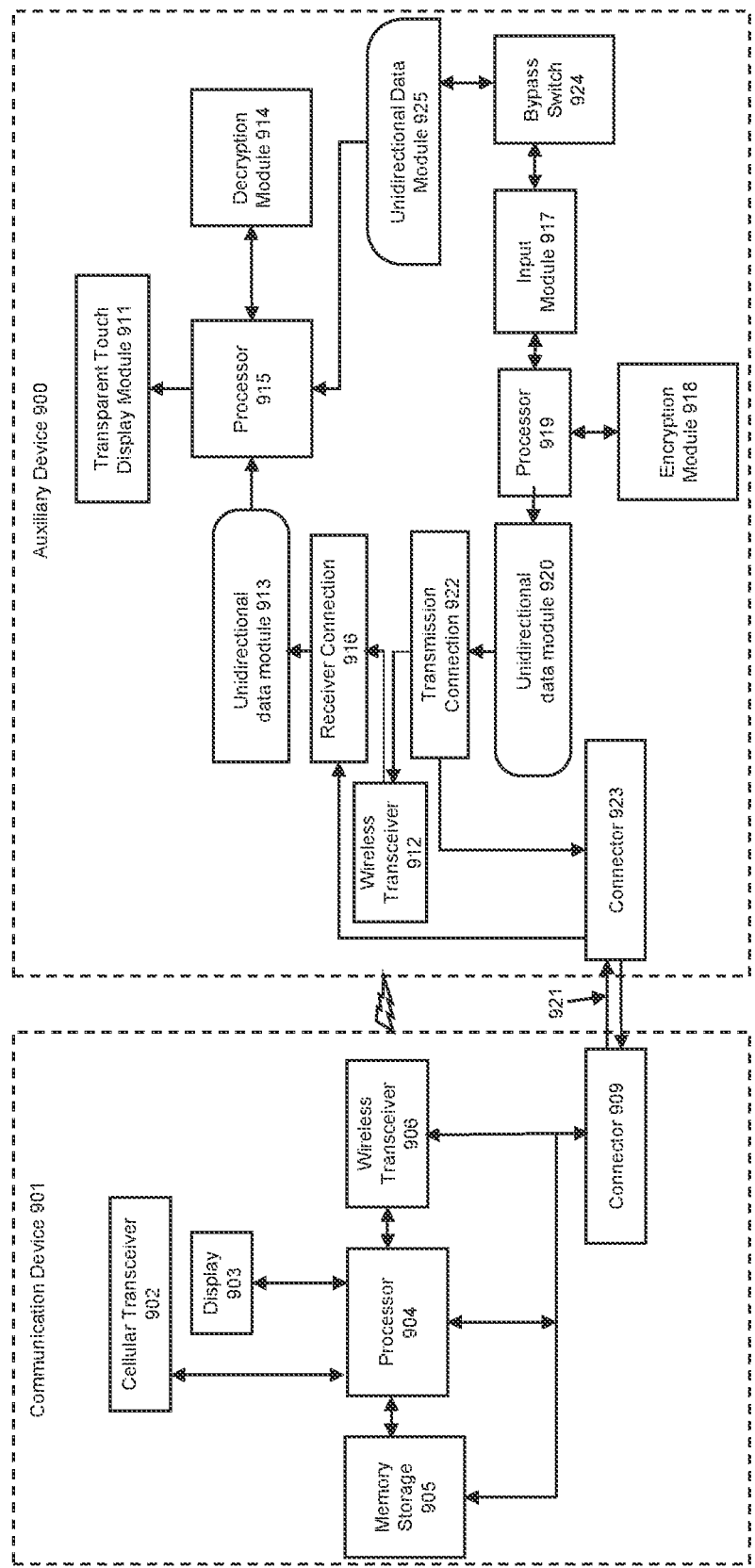
FIG. 2 illustrates a box diagram showing functional components of an exemplary auxiliary device which is in communication with an exemplary electronic communication device.

In FIG. 2, an example block diagram is shown that illustrates example components of a communications device 901 and an auxiliary device 900 communicating with each other. The communication device 901 embodiments and arrangements, for example purposes, have been simplified and more components may be alternatively implemented in other embodiment examples. Conversely, other illustrated components may be omitted. The example communication device 901 illustrated in FIG. 1 is an example of a communication device 901 as described above, and the auxiliary device 900 is an example of an auxiliary device 900 as described above.

The communication device 901 illustrated may comprise a processor 904 or any number of physical processors with potentially more than one core or co-processors which can calculate process and transmit/receive data. The processor 904 or processors can process the data between the touch screen display 903 (such as resistive touchscreen, capacitive touchscreen, and the like), the memory storage 905, which may comprise both non-volatile memory for the storage of the communication device operating system, applications and user data, and volatile memory which can temporarily hold data as directed by the processor 904 in conjunction with the operating system (See FIG. 3) that can control the data and behaviour of the communication device 901 in manners that are both displayed and not displayed user on the touch screen display 903.

A first wireless transceiver 906 associated with the communication device 901 may comprise an onboard processor or controller (not pictured) containing hardware and software required to control wireless functionality on any number of spectrums or types, such as Bluetooth, Wi-Fi, RFID, NFC or any other wireless standard(s) or protocol(s). A second wireless transceiver 912 similarly associated with the auxiliary device 900 would be capable of communicating data to and from the wireless transceiver 906 associated with the communication device 901. This data may include message data, file data, notification data or other data. Such data can be received by the cellular transceiver 902 of the communication device 901 and passed to the counterpart application that can be stored on the memory storage 905 of the communication device 901 that is running on the operating system of the communication device 901 (see FIG. 3) which can be further transmitted to the wireless transceiver 902 of the communication device 901 for further transmission to the wireless transceiver 912 of the auxiliary device 900. Equally, the wireless transceiver 906 of the communication device 901 can receive data from the wireless transceiver 912 of the auxiliary device 900.

In further embodiments, the auxiliary device 900 and the communication device 901 can also be connected to each other via a wired cable 921, capable of transferring data via interfaces that support such modes, such as the Universal Bus Port (USB), lightning connector, or the like. The connecting cable 921 may utilise the connector port 909 of the communication device 901, and on the opposite end connect to the auxiliary device 900 connector port 923.

The example embodiment illustrates the two distinct domains of auxiliary device functionality 900 which operate separately but in tandem with one another in order to provide secure endpoint functionality to the communication device 901. The first domain comprises the features responsible for the transmission of data from the auxiliary device, and includes an input module 917, an encryption module 918, a processor 919, a unidirectional data module 920, and a respective transmission connector 922 that is connected to the connector port 923 and, or wireless transceiver 912. The second domain of the auxiliary device 900 is responsible for data received from the communication device 901 and includes a transparent touch display module 911, a decryption module 914, a processor 915 a unidirectional data module 913, and respective receiver connector 916 that is connected to the connector port 923 and, or wireless transceiver 912.

Each domain, depending on the function, is executed with a varying degree of independence from the other. The first of these domains consists of the following processes: the input of data into the input module 917, its encryption by the encryption module 918, its output flow through the unidirectional data module 920 and its subsequent transmission to the counterpart application residing on the communication device 901 (either via the wireless transceiver 912, or physically via a connected cable 921). Successive transmission to a contact from the communication device 901 over a communications network (such as the internet) is handled by the counterpart application residing on the communication device.

The second domain then consists of the following processes: receiving data from the communication device 901 listening for incoming data initially received by the counterpart application on the communication device 901 from a communication network, such as the internet, then transmitting it to the auxiliary device 900 (either via the wireless transceiver 912, or physically via a connected cable 921). The data is passed via the unidirectional data module 913 open to receiving incoming data. This isolates the input, encryption and transmission functions from the receiving, decryption function, and display function. Data received from the communication device 901 is decrypted by the decryption module 914 and outputted onto the TTDM 911.

Data transmitted from the communication device 901, passes through the receiving unidirectional module 913 as it is incapable of entering the transmission unidirectional data module 920 (as this only permits transmission of data from the auxiliary device 900). This effectively renders data, including potentially malicious data, incapable of passing through to the components of the auxiliary device 900 and its associated input, encryption, and transmission (processors 919, encryption module 918, input module 917) processes. In this way, the unidirectionality creates a physical barrier. Thus, data transmitted from the communication device 901 beyond the wireless transceiver 912 or connector port of the auxiliary device 900 can only enter through the receiver unidirectional data module 913 configured to receive data. This data is consequently decrypted by the decryption module 914 and processed by the processor 915 for output onto the TTDM 911.

Similarly, the unidirectionality of the receiver unidirectional data module 913 prevents all and any data intentionally, accidentally or otherwise from exiting with any information gleaned from the subsequent components responsible for displaying decrypted data (decryption module 914, processor 915, and TTDM 911) thereby preventing exfiltration of data, either plaintext, keys, ciphertext or the like. This creates a unidirectional trapdoor whereby data can only enter but cannot leave.

In one embodiment, the processors (915, 919) of the auxiliary device may possess the equivalent functionality of processing input from the user, either from the input derived directly from the user entering data into the input module 917, the TTDM, 911, or peripherals that can be attached to the auxiliary device 900 such as cameras, microphones or hardware/software controllers providing for other spectrums such as NFC, Bluetooth, WiFi, or the like (not pictured).

The processor 915 may also possess the functionalities of processing the input data received by it from the input module 917 such as message data content, displaying a graphical keyboard, contact, or other options, including but not limited to any previously entered data, coordinating the processing of multimedia images transmitted from peripherals (not pictured), and graphically displaying said data onto the input module 917 for editing, navigation, deletion, manipulation, or like.

The processor 919 may also transmit data to the encryption module 918 for encryption and further transmission to the communication device 901 for either onward delivery to a selected contact, and/or to the sister processor 915 to instruct, update, or process other data for display on the TTDM 911.

The processors 915, 919 may have all the functionality of the other, or each a subset of the other thereof. In one embodiment the processor 915 can process user data entered into the TTDM 911, which may include navigation feedback (such as captive, or other, touch based scrolling input). For example, the user may be parsing through a conversational history, pausing, playing, or initiating video playback, audio, generally engaging with received content, or manipulating the controls to an interactive activity such as a game, with the processor 915 accordingly configured to display the appropriate output depending on the options or commands received via the TTDM 911. Further, the processor 915 can process and display the output data received or derived from the data transmitted to it via the decryption module 914. This received decrypted data may constitute information received from a contact, instructions received from the input module 917, or commands, or data sent from the input module 917 or an associated peripheral (not pictured) attached or connected as part of the auxiliary device 900.

Processors (915, 919) may be general purpose CPUs, ASICs or FPGAs and/or combined with GPU units depending on the configuration.

In another embodiment, the decryption module 914 and the encryption module 918 may form part of the respective processors 918, 919 as a coprocessor, core, software implementation, or the like, and not separate identifiable physical elements. For example, a software service or a co-processor may activate when instructed by the processor only when a certain decryption or encryption activity or task is required to be performed, potentially saving manufacturing, assembly, and energy consumption costs. In an alternative embodiment the decryption 914 and encryption 918 modules may form independent processors, each with their own associated components such as memory chips (not pictured). For example, it may be preferable to speed up critical decryption and/or encryption calculations with dedicated encryption 918 and decryption 914 modules doing the work.

Dedicated encryption 918 and decryption 914 modules may be ASICs designed to perform specific tasks or FPGA, CPUs, or the like.

In one embodiment the unidirectionality of data transmission occurring between the communication device 901 and auxiliary device 900 is imposed by a pair of separate unidirectional data modules (913, 920) controlling the direction that data travels between the auxiliary device 900 and communication device 901. The unidirectional data module—forcing unidirectional flow circuitry—may comprise of an optical isolator, electromagnetic isolator, photocoupler, logic driver, RF isolator or any other unidirectional device that may be used to prevent reverse flow of data from the intended direction.

Optical isolators, and the like, are designed to transmit an electrical signal, including data, between two isolated circuits. For example, a unidirectional optical isolator can straddle either side of otherwise isolated circuitry, such as between the encryption module 918/processor 919 on the one side, and the transmission connector 922 on the other. Internally the optical isolator is divided into two halves. The first half, positioned to receive data, possesses a light emitting diode (LED), such as an infrared LED, or the like, whereby received data from the processor 919 or encryption module 918 connected to it will be converted into LED emittance. This LED emittance is captured by the other half which comprises an internal photosensitive device designed to detect said light from the infrared LED on the opposite side. The photosensitive device relays the received data for onward transmission throughout the auxiliary device 900, such that the transmission connector 922 will in turn transmit said data (e.g. encrypted message data) to the communication device 901 via the expansion socket 923 and cable 921, or wireless transceiver 912 as the case may be. The lack of reciprocal symmetry within the optical isolator prevents a return in kind, or any backflow of data from the communication device 901 to the auxiliary device 900 via the transmission unidirectional data module 920, as there is not an equivalent set of components in the reverse configuration capable of receiving data in the opposite direction. The transmission unidirectional data module 920 thus prevents the malware or malicious data from interfering with the user's ability to encrypt and transmit communications. Similarly, data transmitted from the communication device 901 for decryption and display on the TTDM 911 passes through the unidirectional data module 913. The unidirectional data module 913 may, for example, be positioned between the decryption module 914 and/or processor 915 and the receiver connector 916. This prevents encryption keys, plain text, or generally data from transmitting the opposite direction or from being exfiltrated from the auxiliary device 900 by a malicious or accidental action. Just as above, there is no equivalent set of components in the reverse configuration capable of transmitting data back out in the opposite direction.

In other embodiments unidirectionality may be enforced by the unidirectional data modules (913, 920) comprising of controllers with firmware that may not be overwritten or updated. Said firmware instructions may comprise read only memory (ROM) and can permit data flow to occur only when consistent with the spectrum of their configured hardware and/or software limitations. For example, a unidirectional data module 913 comprising of firmware programmed only to receive data would be incapable of handling data or instructions from the processor 915 instructing it to transmit data. Similarly, the unidirectional data module 920 would be equally only capable of permitting the of data from the processor 919 to the receiver controller 916, and incapable of handling or permitting any data transmission to it from the opposite direction.

Persons skilled in the art will appreciate that unidirectional data modules 913, 920 can comprise of a combination of components, including both firmware and optical isolators to enforce unidirectionality.

The TTDM 911 can display data received by it from the processor 915. For example, the processor 915 may have received data from the communication device 901, such as encrypted message data, and this can be displayed on the TTDM 911. Further, the TTDM 911 can display data in response to inputs it receives directly from a user. For example, the inputs received by the touch portion of the TTDM 911 from the user can be processed by the processor 915. A user may wish to use touch-based scrolling to navigate through a history of received messages, a menu, change settings, alter the user interface, change activity, power off or on the TTDM 911, or the like.

The input module 917 may control aspects of the auxiliary device 900. For example, a user may change options or settings therein. Further, instructions, data, or the like entered by a user into the input module 917 may (subsequent to encryption and transmission beyond the unidirectional data module 920) be propagated via a number of different routes. For example, encrypted message data can pass from the auxiliary device 900 to the communication device via the transmission port 922, wireless transceiver 912, and/or auxiliary device port connection 923 to cable 921 for onward transmission to the communication device 901 via its connector port 909 and/or wireless transceiver 906. At the same time, a copy of the transmitted encrypted message data can be sent to the TTDM 911, meaning that the counterpart application residing on the communication device 901 can utilise the processor 904 to copy the encrypted message as entered by the user into the input module and retransmit this to the TTDM 911 via the communication device's wireless transceiver 906 and/or connector port 909 to the auxiliary device's 900 connector port 923, cable 921 and/or wireless transceiver 912 through the receiver unidirectional data module 913 for decryption by the decryption module 914 and processor 915 for display on the TTDM 911, permitting the user to witness a coherent message chat history on a single display.

In some embodiments, the input module 917 of the auxiliary device 900 may incorporate a bypass switch 924 to redirect data received by the input module 917 directly to the decryption module 914 and/or the processor 915, instead of routing it via the communication device 901. Said switch may comprise of a button, or the like, capable of internally transmitting potentially sensitive commands or data to control the TTDM 911. For example, a user may not wish to input a passphrase to unlock the TTDM 911 by using the touch display of the TTDM 911 as it may be undesirable to risk a possible interception by the communication device display 903 beneath the TTDM 911. It may also be advantageous to be able to configure the TTDM 911 directly without the need to connect and/or power on a communication device 901 to route commands or data by. Instead, the user may, by pressing the bypass switch 924, route inputs, commands, data, or the like, through the auxiliary device 900 internally and directly. The bypass switch 924 itself may comprise of a spring designed to require the user to keep constant pressure on the bypass switch 924 to maintain the bypass channel between the input module 917 of auxiliary device 900 and the processor 915. This may be preferable so as to prevent the user from inadvertently continuously inputting information, data or the like, directly to the processor 915 and TTDM 911 which was unintended. This lessens the chance that, for example, a user accidentally begins inputting message data (which should be routed via the communication device to process the transmission over a network connection) into the processor 915 as opposed to the processor 919, only the latter being capable of processing, encrypting and transmitting said message data via the unidirectional data module 920. In the example embodiment, the bypass switch 924 and the processor 915 are separated by a unidirectional data module 925 preventing any data from the processor 915 or TTDM 911 from accessing the input module 917, encryption module 918, and/or processor 919

The switch 925 may be a physical switch or implemented in software.

As described above, the embodied layout of the auxiliary device 900 portion concerned with the encrypting of data for outward transmission enjoys a high degree of resistance against the receiving of data from anywhere. Such isolation, including from other portions of the auxiliary device 900 itself provide endpoint protection against malicious data potentially infiltrating critical cryptographic functions while utilising component compactness for maximum convenience. Nonetheless, it is may be desirable to include a means for promulgating external data to the isolated transmission portion of the auxiliary device 900. For example, a user may wish to receive data that cannot be conveniently entered at the input module 917 manually each time. At the same time, the user must possess control over such said transfer function, including the opportunity to inspect any external data to be transferred to the transmission and encrypting portion of the auxiliary device 900.

The optical device 926 may be a camera, scanner or the like. The optical device 926 can be positioned on the underside of the input module 917, as described in FIG. 19. When the input module is extended as per FIG. 13-16 the optical device 926 can capture output data displayed on the portion of the TTDM 911 that spans underneath the optical device 926. The outputted data that is displayed beneath the input module on the TTDM 911 may comprise of text, images, QR codes, barcodes, or the like. The optical device 926 may include a processor capable of processing data received from the TTDM 911 by the optical device 926.

For example, the TTDM 911 may display text within a viewable angle of the optical device 926, the optical device 926 reading the characters of the text displayed on the TTDM 911 and with an associated processor (not pictured) may utilize optical character recognition software to process the text for output onto the input module 917. Further, data may be encoded as barcodes, QR codes, or the like. For example, an image may be sent from a contact to the user, the user may wish to further transmit this image, the image will exist on the TTDM 911, said image may be compressed, and/or divided, depending on its size, the resulting data encoded into a QR code, or series of QR codes, whereby the sum totality of the image is represented as encoded data that makes up the whole; which when sequentially displayed to the optical device 926 via the TTDM 911, the QR code(s), can be read by the optical device 926, decoded, and displayed to the user on the input module 917 as a decoded resulting image, whereupon it may be further transmitted as described above. An alternative option (not pictured) could replace machine readable data (e.g. a bar/QR code) with characters such as alphanumeric Latin characters, which could be processed by an optical character recognition program, preventing the surreptitious inclusion, manipulation of malicious data.

Figure 3:
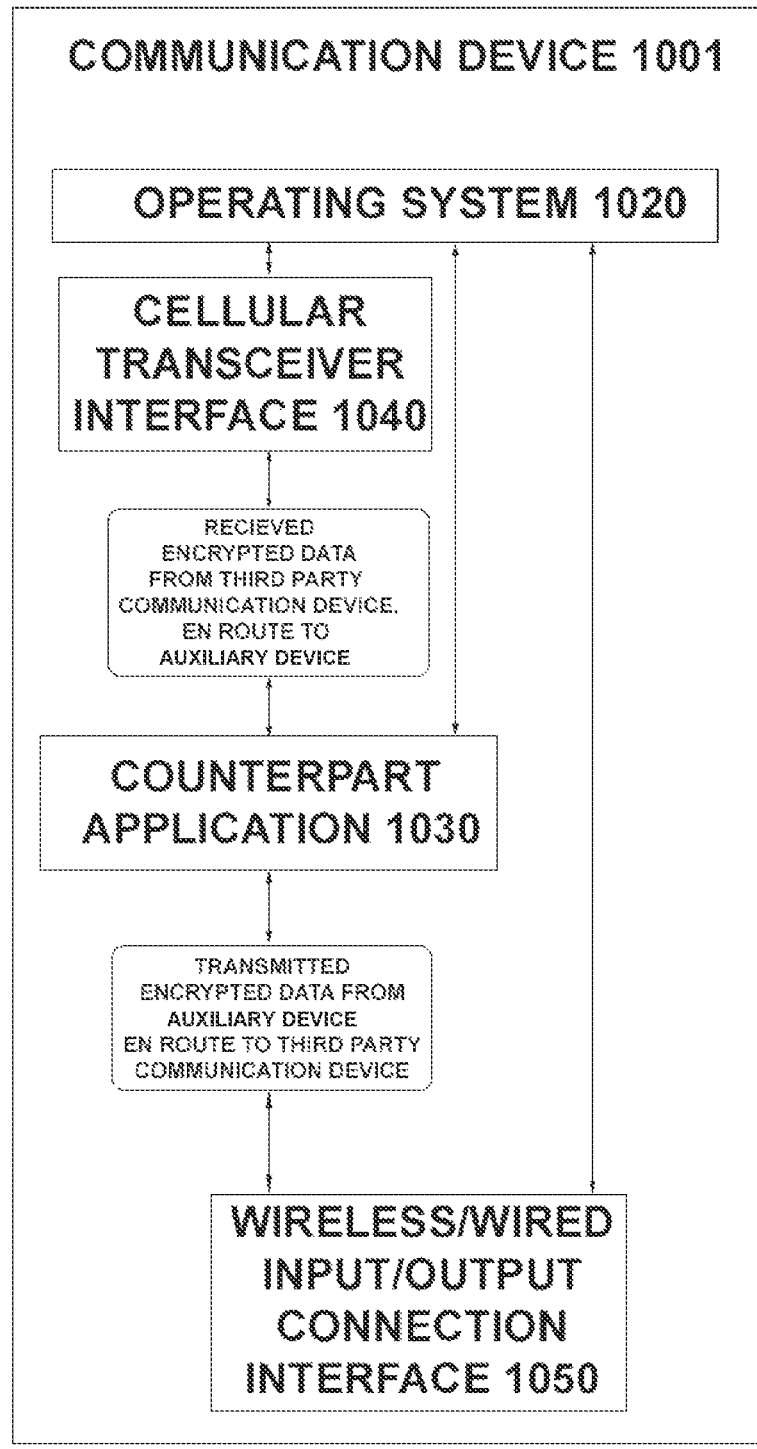
FIG. 3 illustrates a box diagram showing functional components of an exemplary electronic communication device and their interaction with an exemplary counterpart application for handling data for communication with an exemplary auxiliary device.

Turning to FIG. 3, example software components of a communication device 1001 are shown. The communication device 1001 is an example of any communication device described above, including a communication device 1001 that is connected to the auxiliary device 900 (not pictured) described above. The example embodiment illustrates a typical communication device which may include an operating system 1020 in which a multitude of low-level tasks are controlled, including but not exclusive to peripherals, tasks, and components. Example components which the operating system 1020 may control are communication transceivers via a cellular transceiver interface 1040 and, or a wireless/wired input/output (I/O) connection interface 1050. In this embodiment the communication device 1001 may include a counterpart application 1030 in order to facilitate the management of data between the auxiliary device 900 and the communication device 1001. The software components illustrated may be implemented in physical computer hardware, such as the processor 904 and stored in memory 905, and/or the like.

The counterpart application 1030 can act as a conduit between the communication device 1001 and the auxiliary device 900 to receive encrypted data from the auxiliary device, and also to transmit encrypted data to other users over a wider network, such as the internet. For example, the communication device 1001 may receive encrypted data from a cellular network, this data initially interfacing with the operating system 1020 used to control and parse the cellular transceiver 1040. The counterpart application 1030 which listens for incoming encrypted data may then, for instance, notify the user that encrypted data has been received, which, depending on the specific configuration, may automatically result in said data being pushed/transmitted to the auxiliary device 900 for decryption, or may prompt the user to specifically transmit or select the next step.

Counterpart Application

The counterpart application 1030 can also alert the user in specific circumstances, such as in the event the auxiliary device 900 is disconnected from the communication device 1001. For example, if the auxiliary device 900 is connected to the communication device 1001 wirelessly (e.g. via Bluetooth) and said connection is lost or interrupted, the counterpart application 1030 can display an alert. Similarly, the counterpart application 1030 may be able to inform the user of certain statuses of the auxiliary device 1001 components, such as informing the user of an insufficient extension of the input module, or a notification to prompt for a login to unlock the counterpart application 1030 to access its contents such as settings and/or options. Notifications could also consist of informing a user that encrypted data received from the auxiliary device 900 has been successfully transmitted via the communication device 1001 over a communications network (e.g. the internet) to a recipient. The counterpart application 1030 may also alert the user that the communication device 1001 or auxiliary device 900 is low on power, that data was unable to be sent or received, or other status indicators directly from the operating system 1020.

Due to the division of responsibilities enforced by the physical isolation between each portion of the auxiliary device 900—the portion capable of reception and decryption of incoming data, and that capable of the encryption and transmission of data as described above in FIG. 2, the input module 1050 can also be used as to relay data from the input module to the TTDM. For example, instructions to change visual settings on the TTDM may be relayed to the TTDM from the input module via the auxiliary device application 1030.

In another example, the counterpart application 1030 can ensure that data intended for transmission via a cellular transceiver interface 1040 may also be available on the auxiliary device's 900 TTDM. For example, in order for a conversation thread, comprising sent and received message data to be presented in a seamless fashion on the TTDM, the message data generated from the input module (See FIGS. 1,11) requires not only transmission via the counterpart application 1030 to the intended recipient, but also for a copy to be relayed, decrypted and displayed on the local TTDM of the auxiliary device 900. The counterpart application 1030 may be configured to differentiate between encrypted data received from the input module and local packet data commands, such as message data, by identifying data packet headers.

Due to the unidirectionality of the auxiliary device connector port (See FIG. 4) it is not physically possible to accidentally or maliciously relay incoming data to the input module. Incoming data received by the counterpart application 1030 deemed to be message data from a recipient is detected by its associated data header and routed to the TTDM for decryption. Similarly, input data module packets for outward transmission to a recipient are relayed via the counterpart application to the cellular transceiver interface and to the TTDM of the auxiliary device 900.

Figure 4:
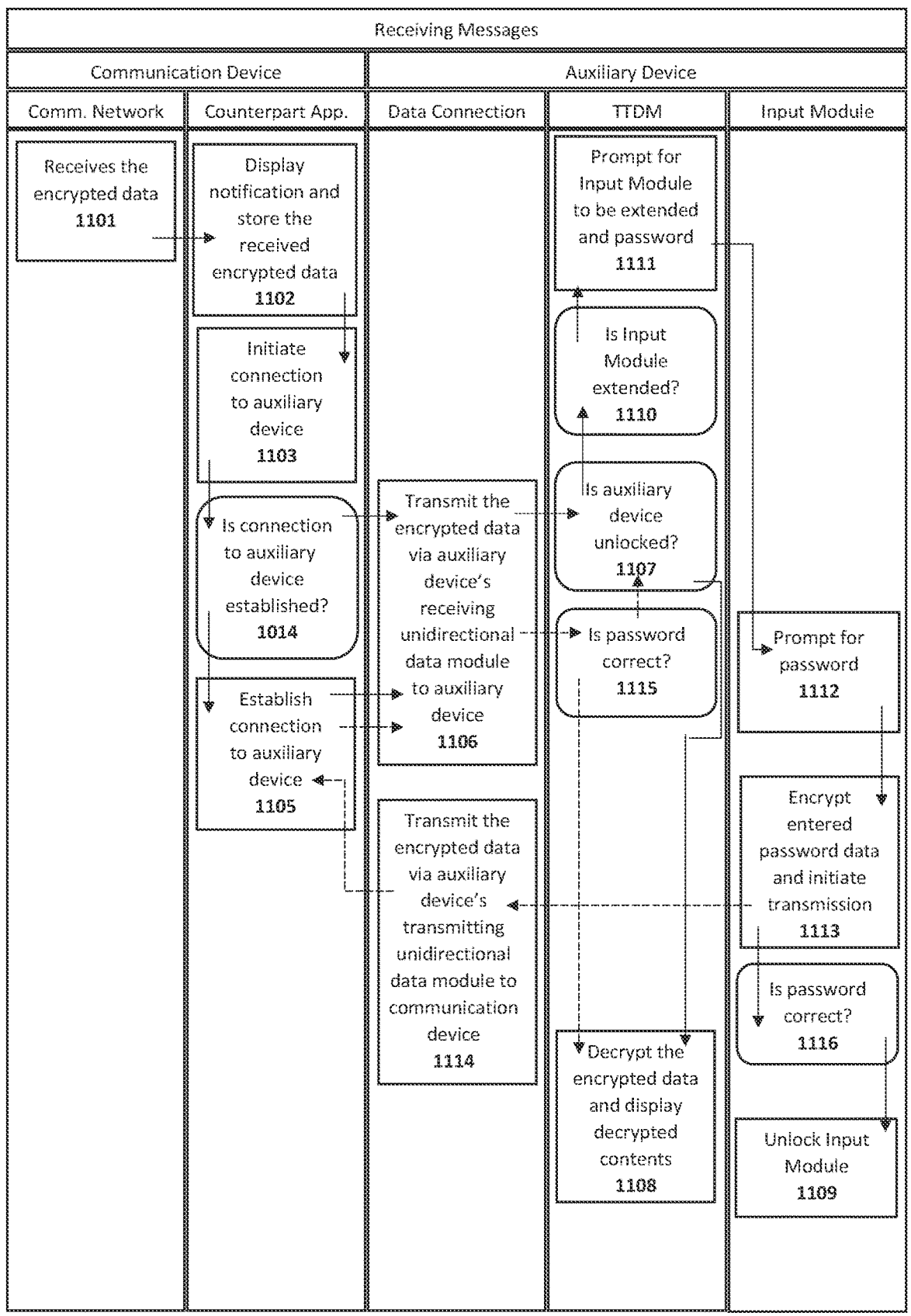
FIG. 4 depicts a flowchart detailing exemplary steps for receiving messages using an electronic communication device with an attached auxiliary device.

In FIG. 4 an embodiment of a data receiving process 1100 is shown. FIG. 4 illustrates the communication device and the auxiliary device processing data destined for output to the user on the auxiliary device when received from a communication network (such as the internet).

At block 1101, encrypted data is received by the communication device from a communications network, creating a notification on the communication device that data has been received, whereupon it is stored in memory of the communication device by the counterpart application at block 1102, which in the specific embodiment example, is further configured to initiate a connection to the auxiliary device in block 1103 upon receipt of encrypted data from block 1102.

At block 1104 counterpart application checks for a connection. At block 1105, and upon establishment of a connection between the communication device (which may be wired or wireless) the encrypted data in block 1101 is transmitted to the auxiliary device via the unidirectional data module configured to receive incoming data at block 1106, as described above.

The TTDM listens for incoming data from counterpart application of the communication device. If incoming data is received, and the auxiliary device is already unlocked as per block 1107 (e.g. in current use) the encrypted data is decrypted by the decryption module in block 1108 as described above and displayed on the TTDM. Otherwise, the process will require an unlock sequence that will require the input module to unlock the auxiliary device in block 1109, which at block 1110 a notification is given to extend the input module and enter a password 1111.

At block 1112 a further notification is displayed on the input module requesting that the password to unlock the auxiliary device is entered. Data entered into the input module is encrypted prior to transmission in block 1113. In the current embodied example, there is no direct connection between the input module and the TTDM, thereby requiring the encrypted password data to be transmitted via the unidirectional data module configured to transmit from the auxiliary device to the communication device, as described above, in block 1114.

The counterpart application, after establishing a connection to the auxiliary device in block 1105, routes the encrypted password data to the TTDM via the unidirectional data module configured to receive incoming data in block 1106. A correct password in block 1115 finishes the unlock sequence, and an incorrect password leads to a return to block 1107, where the TTDM continues to listen for a correct encrypted password data from the input module via the counterpart application of the communication device to unlock, decrypt and display the encrypted data received from block 1102. A correct password also completes the unlock sequence for the input module in block 1116. An incorrect password will fail to unlock the input module.

Exemplary Communication Procedures

Figure 5:
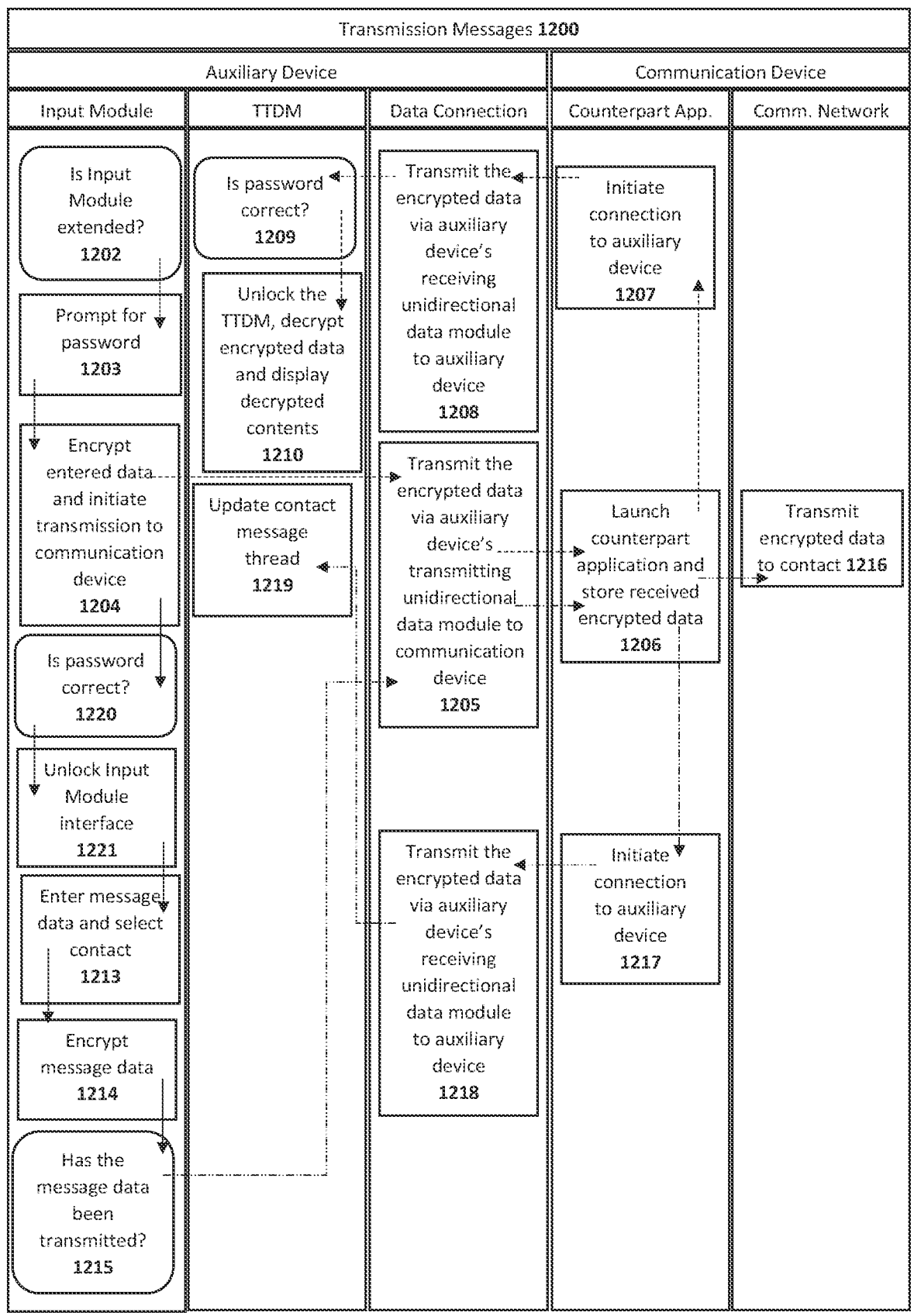
FIG. 5 depicts a flowchart detailing exemplary steps for transmitting messages using an electronic communication device with an attached auxiliary device.

Turning to FIG. 5, an embodiment of a data transmission process 1200 is shown. FIG. 5 illustrates the communication device and the auxiliary device handling data destined to be entered into the input device, which is initially in a locked state, for transmission to a contact operating another auxiliary device that will receive the encrypted data from a communication network (such as the internet) as per FIG. 4 above.

At block 1202, a check whether the input module is extended to receive data entered by the user occurs. At block 1203 a locked state input module prompts for the required password or passphrase. At block 1204, a password/phrase entered into the input device in response to the prompt is encrypted and transmitted to the input module. At block 1220 the received password/phrase is checked, and if the received password/phrase is correct then at block 1221 the input module user interface is unlocked.

The encrypted password data in block 1204 is also transmitted, via the auxiliary device's unidirectional data module, to the communication device in block 1205. The incoming encrypted password data received by the communication device in block 1205 launches the communication device's counterpart application in block 1206.

The encrypted password/phrase, once received, is stored in the memory of the counterpart application on the communication device in preparation for initiating a further connection to the auxiliary device in block 1207, at which point the encrypted password/phrase data may be transmitted to the TTDM via the receiving unidirectional data module on the auxiliary device, at block 1208. If the TTDM (the decryption module or processor, not pictured) determines the password is valid in block 1209, the TTDM is unlocked in block 1210. Upon unlocking the TTDM in block 1210, the contents of different message threads and associated data is displayed, for example, a pre-existing conversation with a contact.

In the illustrated embodiment the password entered into the input module at block 1204, if found to be correct in block 1220, unlocks the input module and thereby makes accessible its further functionalities, such as contact selection. In block 1213 a user can, using the input module, select a contact and, having done so, enter a message into the input module. After the user has finished drafting the message, the user can choose to send the message. The process of message transmission begins at block 1214 by encrypting the message data prior to transmission. Transmission at block 1215 sees the encrypted message data being sent via the auxiliary device's unidirectional data module to the communication device at block 1205. On successful transmission to the counterpart application on the communication device in block 1206, the counterpart application stores the encrypted message data and proceeds to transmit it over the communications network to the contact in block 1216. A copy of the encrypted stored message data in block 1206, in order to update the message thread, is also relayed to the TTDM receiving unidirectional data module at block 1218. The message sent by the user is reflected on the TTDM in block 1219.

FIGS. 3 through 5 have illustrated examples describing the use of a communication device with auxiliary devices enjoined to transmit and receive encrypted data. These examples demonstrate an important concept: that through ensuring that the flow of data is unidirectional the ability to compromise the transmission of this data is physically denied. Once data is received and decrypted on the TTDM, it cannot travel in the opposite direction due to this physical unidirectional isolation. In this way, the TTDM acts solely as a passive receiver of information. This property prevents the user or malicious software from extracting, exposing or resending decrypted data content, including private information. Coordination and synchronization of the two constituent parts—the transmission and receiver—are discussed in FIG. 6 below.

Figure 6:
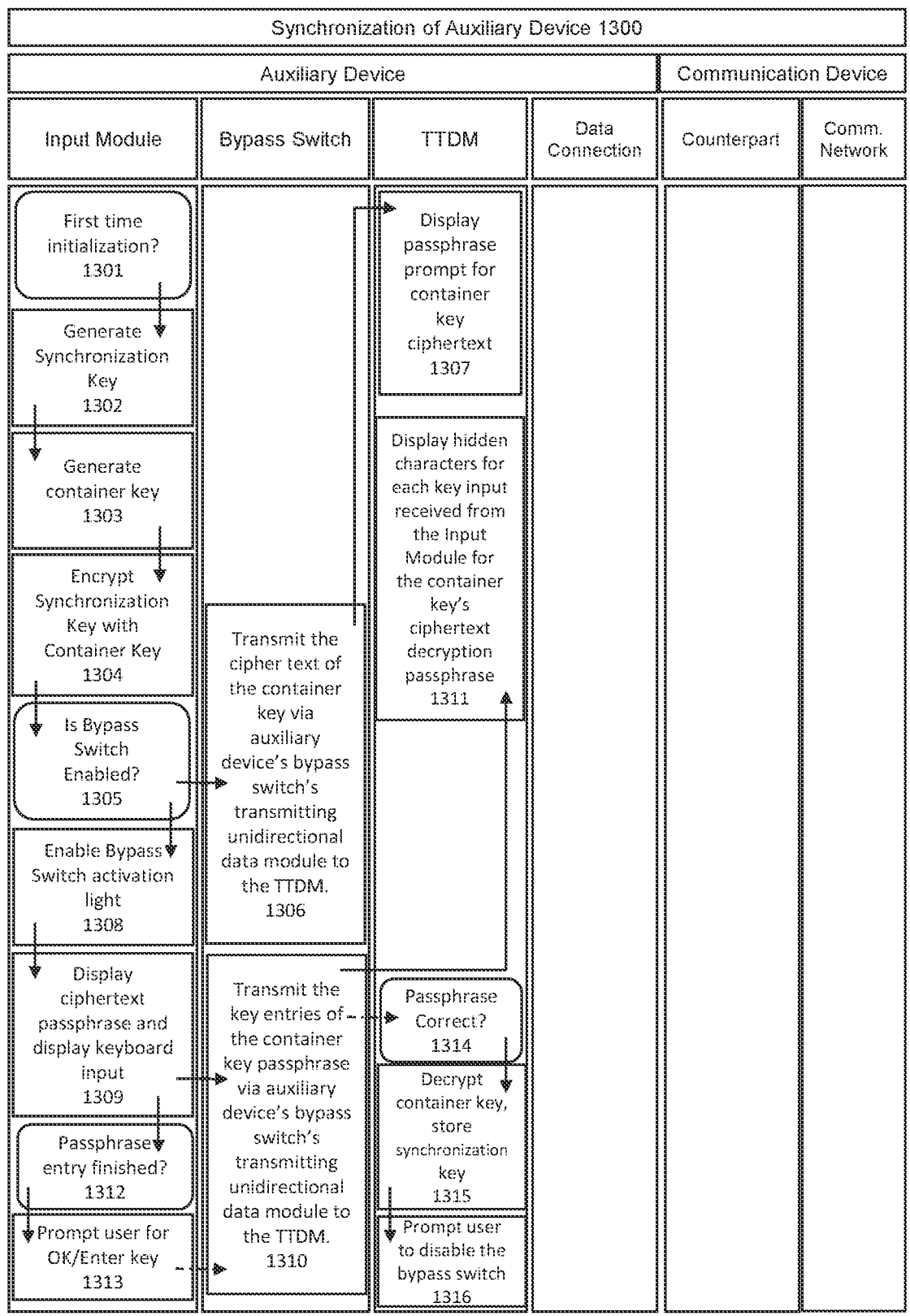
FIG. 6 depicts a flowchart detailing exemplary steps for synchronization of the auxiliary device.

FIG. 6 illustrates generally an example synchronisation of the input module, and the TTDM. In the illustrated block 1300, the auxiliary device upon initialisation (first use) may require the requisite synchronisation of control instructions via the input module to the TTDM in a secure and convenient manner.

In block 1301, the input module determines if it is uninitialized. An uninitialized auxiliary device has no mechanism for transmitting instructions from the input module to the TTDM. Block 1302 generates a synchronisation key (for example using a symmetric-key algorithm) to encrypt data transmitted from the input module (such as commands and message keys, contact keys (See FIGS. 7 & 8) to enable the synchronisation of events to occur between the input module and the TTDM. Counterparts to the synchronisation key may be headers and checksums (not pictured). Block 1303 creates a container key to encrypt the synchronisation key to protect the synchronisation key from interception while in transmission (block 1304).

In block 1305, the input module checks whether the bypass switch is enabled to transmit the container key ciphertext directly to the TTDM. If it is enabled, in block 1306 the container key ciphertext is transmitted via the unidirectional data module on the bypass switch on the input module to the TTDM, bypassing the communication device. The TTDM, in block 1307, upon receiving the ciphertext, prompts for the ciphertext passphrase to be entered into the input module.

Upon enabling of the bypass switch, a physical light may be illuminated to visually remind the user that bypassing is enabled in block 1308.

In block 1309, on enablement of the bypass switch the input module is configured to display the passphrase of the container key's ciphertext as well as a touch-based keyboard input. The inputs entered into at the input module in block 1309 are stored and reflected on the TTDM in block 1311 as hidden characters, which could typically be represented as an asterisk per character. Once the passphrase has been entered in block 1312 the input device waits for the user to select the OK/Enter key or equivalent in block 1313. Once transmitted, the input module informs the TTDM via its unidirectional data module in block 1310 that the passphrase needs to be checked in block 1314. If the passphrase is correct, block 1315 decrypts the container key, and stores the synchronisation key, thereby securely transferring the synchronisation key to the TTDM so it can be used to decrypt instructions and other data received encrypted by and received from the input module or processing by the TTDM.

In block 1316 the TTDM prompts the user to disable the input module bypass switch, as the synchronisation key transfer is complete.

Figure 7:
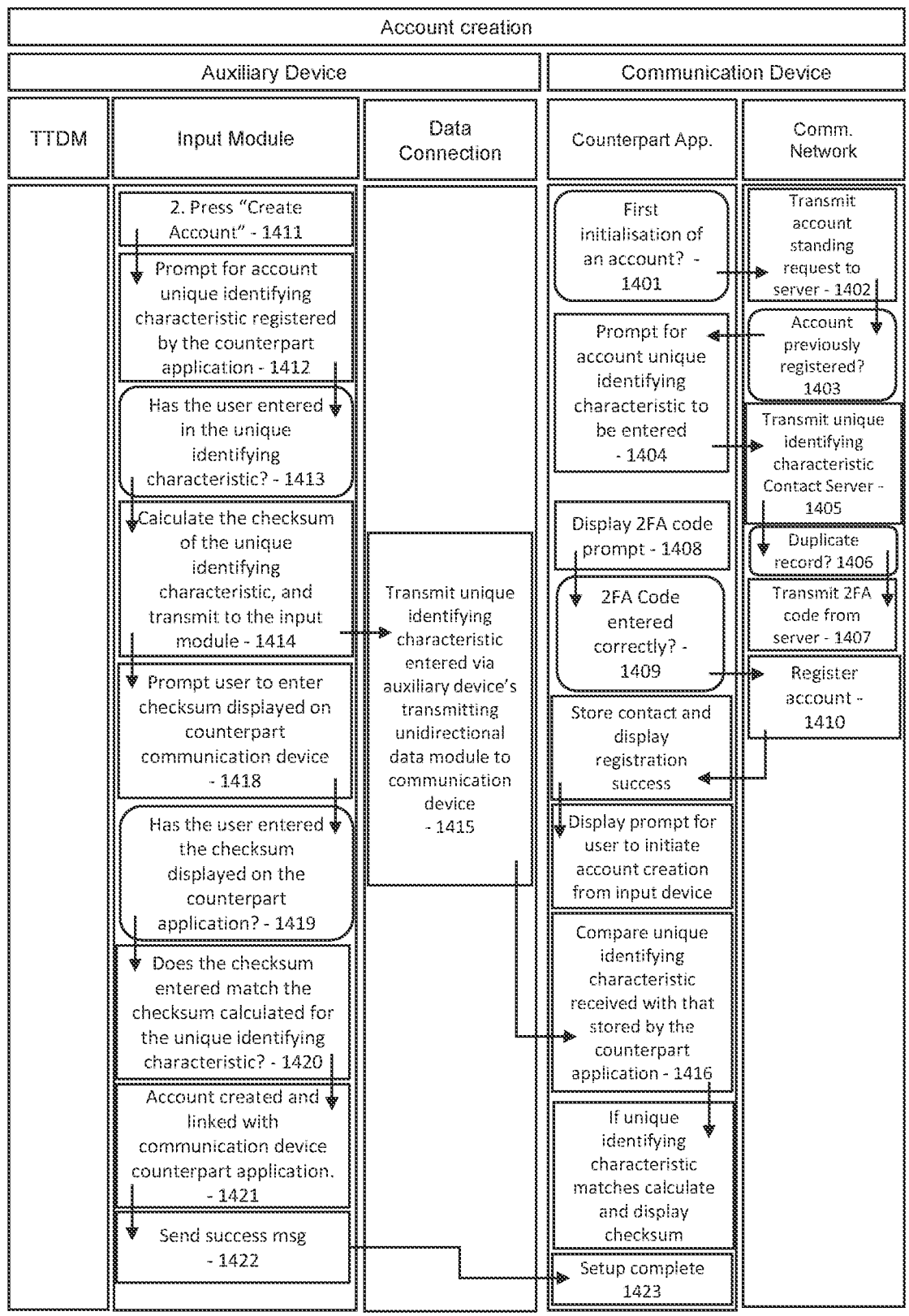
FIG. 7 depicts a flowchart detailing exemplary steps for creation of a user account by a user of an electronic communication device with an attached auxiliary device.

In FIG. 7 at block 1401 the counterpart application will, on first initialisation, check if the communication device has previously been registered with a contact server (block 1402). If not (block 1403), the user will be prompted to generate a unique identifying characteristic (UIC) for use on the communication device counterpart application (such as a phone number, username etc) at block 1404. Once entered, the UIC(s) will be transmitted to the contact server (block 1405), which in turn will check against existing records for possible duplication at block 1406. In the event that a duplicate record exists, or that a proposed account is already taken and not unique, the user will be requested to attempt again. In the absence of a duplicate record, a two-factor authentication code (2FA) (block 1407) will be sent from the server to the communication device (block 1408) through the communication network (e.g. SMS). Upon correct entry of the 2FA code (block 1409), the UIC selected by the user will be stored on the communication device and the given communication device will be registered with the contact server (block 1410).

FIG. 7 further illustrates an embodiment in which an account, created on the input module of the auxiliary device, is linked to the counterpart application operating on the communication device.

Creation of a user account on the input module requires the user to interact with the 'Create Account' (block 1411) option on the input module which begins the account creation process. The 'Create Account' process generates a series of prompts (block 1412) requesting the user enter into the input module the credentials that match the UIC (e.g. phone number/username) previously entered into the counterpart application on the communication device. Once the UIC(s) are entered, and the user presses 'OK', (block 1413) the UIC(s) are check-summed, stored in memory on the input module and the UIC(s) are further transmitted (block 1414) to the communication device from the input module via the unidirectional data module (block 1415).

In block 1416 the counterpart application on the communication device, upon receiving the UIC(s) checks that the UIC(s) received are identical to the UIC(s) stored.

If the counterpart application determines that the UIC(s) stored match the UIC(s) received from the input module, (indicating there was no typographical or transmission errors), the counterpart application will display the checksum of the UIC(s) on the communication device display (block 1417).

In parallel to the process beginning in block 1414 the input module display will prompt for the checksum displayed on the communication device's display to be entered into the input module prompt (block 1418). Upon entering the checksum displayed on the counterpart application into the input module (block 1419), if correct (block 1420), the input module will store the user account and the user will be informed on the input module display (block 1421) that account creation was successfully completed. A success packet will be transmitted (block 1422) from the input module to the communication device notifying the counterpart application that an account has been successfully set up (block 1423) and that the input module has been successfully associated with the communication device.

Figure 8:
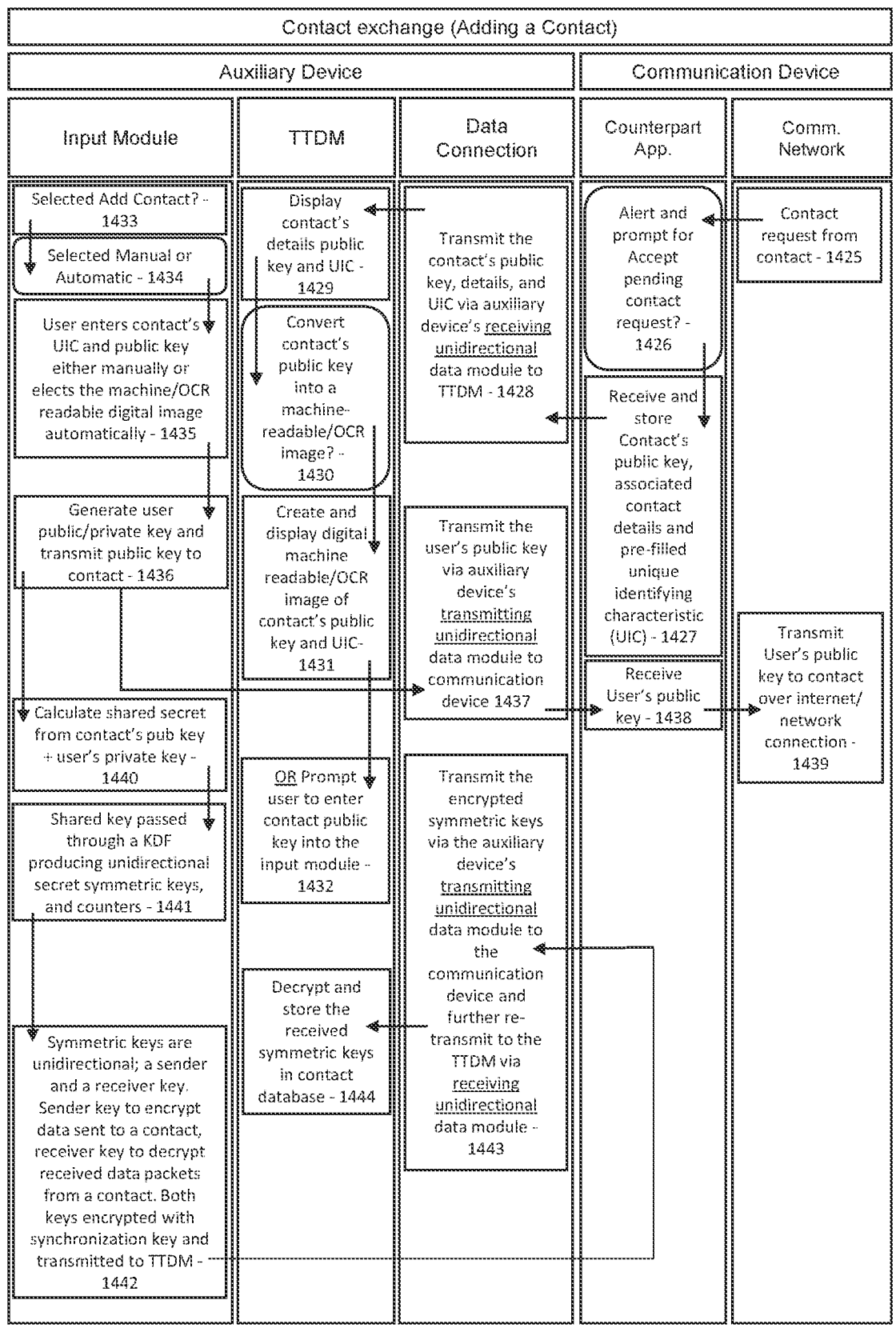
FIG. 8 depicts a flowchart detailing exemplary steps for contact exchange using an electronic communication device with an attached auxiliary device.

FIG. 8 illustrates a block diagram process of accepting and adding a contact by accepting a contact request transmitted by the contact's auxiliary device. Accepting a contact begins with a contact sending a request over a communication network (such as the internet) at block 1425 to the communication device to be processed by the recipient user's counterpart application. The user may be alerted by the communication (block 1426) either by the counterpart application creating a display prompt that a contact request is pending, and, or audibly alerting the user that a contact request is pending.

In FIG. 8, block 1427 further illustrates that if the unique identifying characteristic (UIC) details from the contact's pending contact request match information from an existing contact in the user's communication device's contacts list (e.g. phone number/username etc.), the counterpart application receiving the UIC may automatically associate the contact details (e.g. given name) stored on the communication device and import said details into the counterpart application by pre-emptively filling the contact's details.

In block 1427 If the user does not wish to import or use the pre-emptively filled details in the counterpart application for the pending contact, the user may instead add the contact to the counterpart application's contact list by entering new contact details into the counterpart application to associate with both the contact's UIC and public key.

The user, on agreeing to add the contact, initiates the transfer of the contact details, a copy of the contact's UIC(s) and public key to the TTDM. The contact's details, public key and UIC(s) are then all transferred to the TTDM via the auxiliary device's receiving unidirectional data module. (block 1428).

Upon receipt by the TTDM, the contact's details, public key and UIC(s) are saved to a contact user database. The public key is subsequently displayed to the user on the TTDM (block 1429), whereupon the user is prompted, on the TTDM, to enter the public key displayed into the input module. A prompt 1430 may request the user select the creation digital representation (e.g. a QR code/barcode Optical Character Recognition (OCR) friendly input via the optical device (FIG. 8) which if selected, the will be generated on the TTDM 1431, if the user wishes alternatively a raw character output to be manually inputted (block 1432).

FIG. 8 further illustrates the user, at block 1433, continuing the add contact process on the input module as prompted by the TTDM in blocks 1429, 1431 and/or 1432. Once the user has selected the method (block 1434) of entering the contact's public key, contact details and UIC(s), the user is prompted to confirm that the public key displayed on the TTDM matches with the key entered into the input module (block 1435). Once confirmed, the user on the input module is given the opportunity to create a name for the contact so that they can be identifiable on the input module's contact list.

Block 1436 illustrates that in response to entering the contact's public key, the input module creates a public/private keypair for the user (see FIG. 10), and at block 1437, transmits the user's public key to the contact via the auxiliary device's transmitting unidirectional data module to the counterpart application (block 1438) on the communication device, whereupon the user's public key is further transmitted to the contact over the communication network to which the communication device is connected, such as the internet (block 1439).

Figure 10:
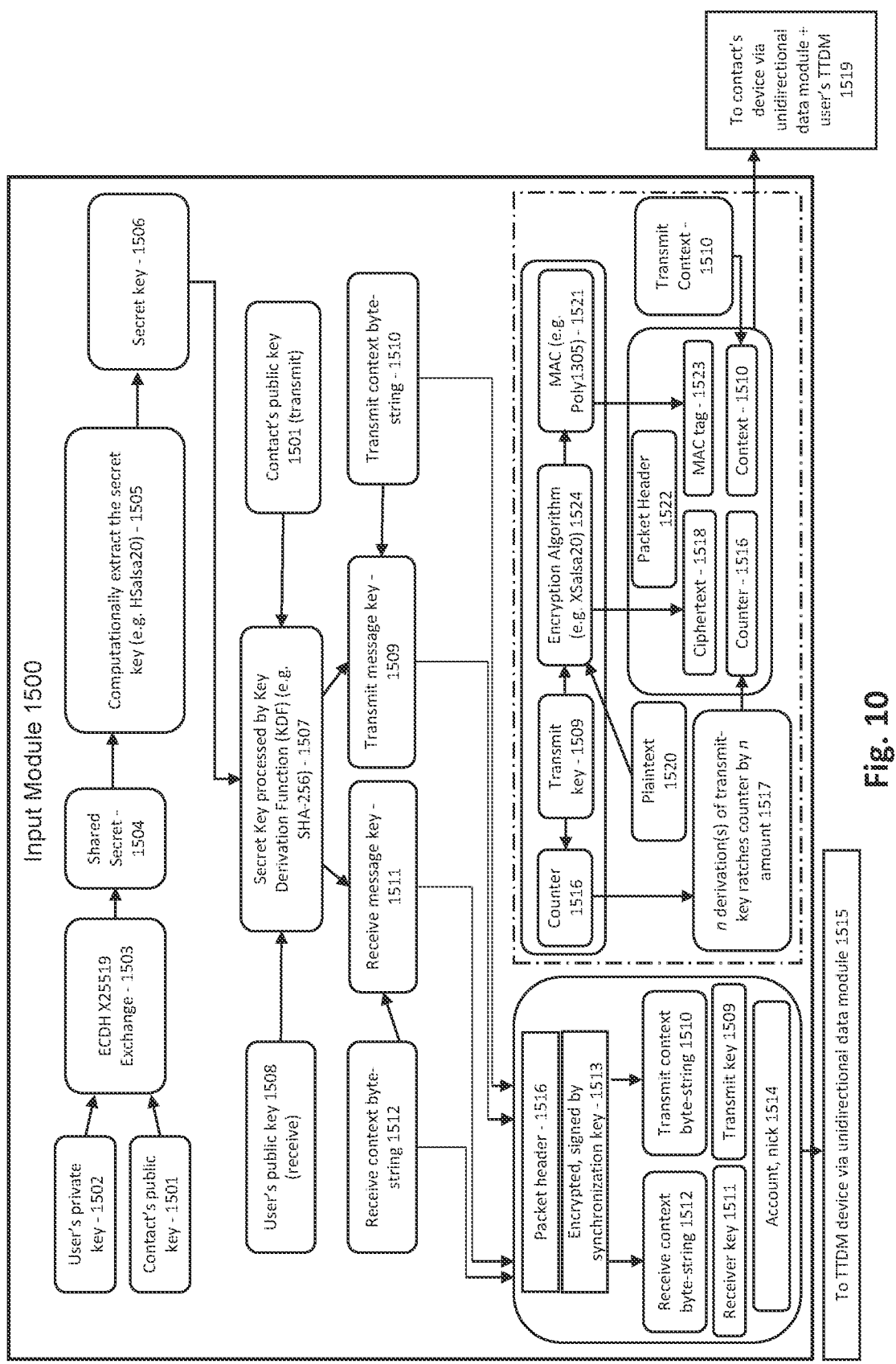
FIG. 10 depicts a flowchart detailing steps an exemplary auxiliary device input module undertakes to prepare a message for secure communication.

Block 1440 further illustrates the computation of the shared secret (see FIG. 10). The shared secret is computed from the contact's public key (entered at block 1435) and the private key of the user's private/public keypair generated at block 1434 on the input module. At block 1441 the shared secret is passed through a computational extractor (KDF) that will produce per-direction (secret) symmetric keys, headers, and counters etc. (see FIG. 10).

Block 1442 further illustrates that the unidirectional symmetric keys (the symmetric key for encrypting data to be transmitted to a contact, and the symmetric key for encrypting data received from a contact, headers, contact information, and counters etc) will be encrypted by the synchronisation key (FIG. 6) and transmitted to the TTDM.

Block 1443 illustrates the transfer of the encrypted symmetric keys. The transfer of the encrypted symmetric keys occurs by the input module utilising the transmitting unidirectional data module to transmit the encrypted symmetric key to the communication device (over the transmitting unidirectional data module). Once received by the counterpart application, the encrypted symmetric key is re-transmitted to the TTDM from the communication device via the receiving unidirectional data module. Block 1444 illustrates that the synchronisation key on the TTDM is used to decrypt the encrypted symmetric keys. Upon decryption of the symmetric keys, headers, contact information, and counters etc are is stored in the contacts list.

FIGS. 9A-D illustrates an exemplary series of user interface options, notifications and associated prompts generated on the input module 1421 to facilitate the inputting of contact data during the process of adding a contact. The installed counterpart application running on the communication device 1423 during the contact adding procedure may process said received data.

Figure 12A:
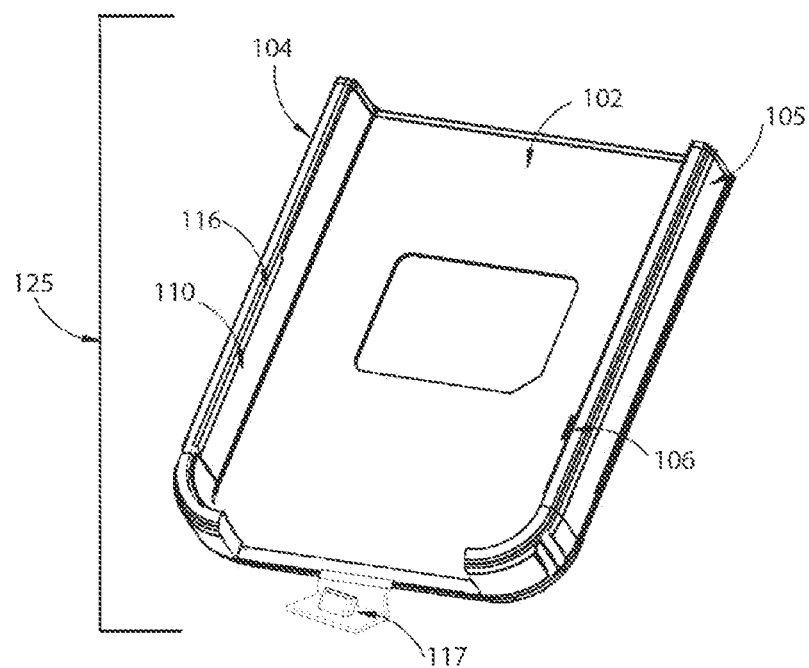
FIG. 12A shows an isometric view of the exterior appearance of an exemplary auxiliary device.

FIG. 9A illustrates an input module 1421 displaying an unlocked-state interface 1424 attached to an auxiliary device 1425 in the extended position overlying a communication device (e.g., communication device 101, FIG. 12A,B). In some embodiments the user interface 1424 of the input module, while in the unlocked state, may display an "add contact" 1426 option. FIG. 9A illustrates a contact list 1427 devoid of any contacts with an option displayed to populate the contact list by the user interacting with the "Add Contact" 1426 button. In some embodiments, upon a first launch of the contact list 1427 a notification 1428 appears informing the user that the user needs to begin populating the contacts list. FIG. 9A illustrates a notification 1427 generated and displayed in response to receiving the first communication. Notification 1427 includes content from the initial launch communication (e.g., "Contact list Empty. To begin press the 'Add Contact' button!").

FIG. 9A also illustrates that in some embodiments, the notification also includes visual characteristics 1428 (e.g., logo, icon, color scheme) associated with the task (e.g., add a contact). In some embodiments, the notification includes control elements, such as a link or instructional prompt for opening the initial add contact context menu to continue interacting with the add contact process.

FIG. 9B illustrates an embodiment in which, in response to detecting user input on the add contact button 1428 in FIG. 9A the notification prompt 1426 ceases to be displayed, as shown in FIG. 9B. In some embodiments, this includes clearing the one or more input module 1421 notification prompts (e.g. notification prompt 1426) and displaying the first stage of the 'add contact' process. In some embodiments, this may create a prompt 1430 requesting the user input the unique identification data 1445 belonging to the user's communication device (e.g. a mobile cell phone number/username) associated with the communication device 1423 and the counterpart application residing on said communication device 1423 has been registered to. In some embodiments, alternative unique identification data 1445 may be used, instead of a phone number, such as an alphanumeric username.

Once the unique identification data of the user 1445 is entered, it is also transmitted to the communication device, whereupon the counterpart application stores and registers user identification number output from the input module 1421. In some embodiments, this includes clearing one or more notification prompts (e.g. notification prompt 1430) and displaying the second stage of the 'add contact' process.

FIG. 9C illustrates an embodiment whereby in response to the input of the unique identification data 1445 and the user pressing an 'OK' button on the input module 1421, the notification prompt 1430 requesting that the unique identification data be entered ceases to be displayed, with the next stage of the add contact process then appearing. This embodiment may comprise of a prompt 1433 requesting that the unique identification data for the specific contact 1448 is inputted into the input module by the user, along with a nickname (for example, "Bob") 1434 for the contact.

According to the preferred embodiment, once the user, having entered the name 1434 and the unique identification data of their contact 1448, a key exchange is initiated (see details FIG. 10) by tapping or pressing the "OK" button 1438. The contact is stored in the input module 1421.

To complete the process, the input module 1421 then transmits the name 1434 and unique identification data of the contact 1448 to the counterpart application on the communication device 1423, which stores and registers the contact. In the preferred embodiment, the said name 1434 and unique identification data 1445 is further transmitted from the counterpart application 1422, as received by it from the input module 1421, to the TTDM 1437 whereupon the name 1434 and contact unique identification data 1445 is also stored by the TTDM 1437; thereby synchronizing the contact database between each corresponding portion of the auxiliary device 1425.

FIG. 9C also illustrates that in some embodiments, the TTDM 1437 upon receiving said name 1434 and unique identification data 1445 displays the notification "Waiting for [Contact name's] public key" 1439.

FIG. 9D illustrates the input module 1421 and the TTDM 1437 after the user has initiated the key exchange process illustrated in FIG. 9C. In the preferred embodiment, the input module 1421 ceases to display the notification and prompt in FIG. 9C, and displays a notification directing the user to interact with the input module display 1424 by entering the contact's public key with the message "Enter Public Key Below" 1440, with the corresponding text box 1441 provided.

The exemplary embodiment in FIG. 9D illustrates that the TTDM 1437, in response to detecting the contact's public key 1442, ceases to display the waiting notification 1439 ("Waiting for [Contact nickname's] Public Key") as shown in FIG. 9C. In the preferred embodiment said notification 1439 is cleared and, upon receiving the contact's public key 1442, is replaced with said contact's public key 1442 thereby displaying the contact's public key 1442 on the TTDM 1437 with the notification to "Please enter [Contact] 's Public Key into the Input Display" 1443.

Entering the contact's public key 1442 displayed on the TTDM 1437 into the input module 1421 and pressing the "OK" button 1444 on the input module 1421 completes the key exchange process and adds the contact to the contact databases (see FIG. 10), resetting to the stage one display in FIG. 9A, with the new contact (in this example, Bob).

FIG. 10 illustrates an example input module 1500 generating of the initial keying material, utilising the keying material for the subdivision of further symmetric keys using key derivation, and utilisation of associated counters and context strings.

The user's input module 1500, upon receipt of the contact's public key 1501 combines it with the user's private key 1502, creating a shared secret 1504 via a Diffie-Hellman Exchange (e.g. Elliptic Curve Diffie-Hellman exchange over Curve25519) ECDH X25519 exchange 1503.

It is obvious to one of ordinary skill in the art that the high amount of entropy present (from a statistical viewpoint) of a resultant shared secret 1504 may not be distributed evenly in key-space. Uneven distribution prevents indistinguishability randomness, which is required of a shared secret 1504 for (inter alia) subsequent key derivation (see NIST SP-800 SP 108 chapter 7.1, Cryptographic Strength). The shared secret 1504 may be processed further via a computational extractor 1505 (e.g. HSalsa20 algorithm) to produce the secret uniform key 1506 (secret key) that is indistinguishable from random.

Message Keys are unidirectional, that is, the key utilised for the encryption of data for transmission by the user to the contact is separate to the key used to decrypt data received from the contact by the user.

The creation of a unidirectional key to encrypt data for transmission by the user's input module to the contact may comprise performing n key derivations on the initial keying material, the secret key 1506, and the (concatenated) contact's public key 1501, using a key derivation function (KDF) (e.g. SHA-256, BLAKE2b, and, or a hash combination thereof). The resultant output is a transmit message key 1509. A byte string may also be concatenated to the transmit message key 1509 to denote context 1510 sometimes known as context binding, direction flagging or contextualising, the derived keys.

Similarly, the creation of a unidirectional key to decrypt data received from the contact by the user may comprise performing n key derivations on the initial keying material, the secret key 1506, and the (concatenated) user's public key 1508 using a key derivation function (KDF) (e.g. SHA-256, BLAKE2b, and, or a hash combination thereof). The resultant output is a receive message key 1511. A byte string may also be concatenated to the receive message key 1511 to denote context 1512 sometimes known as context binding, direction flagging or contextualising, the derived keys.

In the illustrated directionality the context labelling 1510, 1512 by a byte string denoting the direction (e.g. transmit/receive) can be concatenated to the respective message key's direction (transmit/receive) prior to the encryption 1524 of the plaintext 1520 and creation of the resultant message authentication code's (MAC) 1521 from of the ciphertext 1518.

Once the unidirectional symmetric message keys 1509, 1511 are generated along with the associated directional byte-strings 1511, 1512, the contact account details, nickname 1514 are encrypted and signed 1513 using the synchronisation key and a MAC algorithm such as Poly1305, and transmitted from the input module to the TTDM via the communication device 1515, this process occurring through the unidirectional data modules that connect the input module to the communication device and the communication device to the TTDM. The counterpart application, reading the header packet 1516, which is authenticated by the MAC of the synchronisation key, directs the data to the TTDM. Once the synchronisation key has been successfully transmitted to the TTDM, the contact is entered into the TTDM contact database.

For forward secrecy, the symmetric unidirectional keys (transmit 1509 and receive 1511) illustrated in FIG. 10 are required to be unique per data packet, or per message transmitted (and thus received). In the illustrated example, this may be achieved by creating a 'hash ratchet', whereby the initial sender and receiver keys are respectively hashed using a key derivation function or a non-invertible hash function(s) (e.g. SHA-256, BLAKE2) for each data message/packet transmitted. The creation of a new symmetric key from the previous key using a non-invertible key hash, or hash key derivation function per transmission for the encryption of a data packet or message (in each direction) results in the previously used key being indeterminable from the said subsequently created key that will used to encrypt data packets and/or messages subsequent to it. As this process occurs for each data packet/message to be encrypted, it 'ratchets' through hashes preventing the calculation of the former key from the latter as the nature of a hash function/hash key derivation is indeterminably irreversible.

In order to preserve states between the user auxiliary devices' constituent parts (input module, TTDM) and the contact's auxiliary device (and its respective constituent parts), and to prevent a desynchronization of decryption keys—either accidentally and, or incidentally (due to network issues such as dropped packets), or maliciously (due to replay and, or reordering attacks)—a hash ratchet counter 1516 (e.g. initialised to zero) can be included with each data packet transmitted containing ciphertext to keep track of the number of non-inverted hash key derivation function 'ratchets' that have occurred. The counter 1516 tracks the hash ratchet state between devices, and between the constituent device component states (input module, TTDM). The counter may be encrypted.

For example, the transmit key 1509, hashed subsequently once to its creation with a non-invertible hash function causes the input module hash counter to correspondingly increment 'ratchet' one iteration forward 1517. The counter, as an integer, may be represented as a 32 bit (4 octet) and transmitted with the ciphertext 1518 to consequently update the respective recipients that receive it 1519. On the sender's TTDM the counter 1517 delivered with the packet 1522 will note the current n iteration of the hash ratchet state and enable decryption of the corresponding ciphertext 1518 once received by user the TTDM 1519 to update the user's conversation window, and on the contact (recipient) TTDM. The counter 1517 maintains the hash state between the contact and users' auxiliary device in totality, and decrypts the received ciphertext 1518 in the conversation window.

FIG. 10 illustrates that data, such as a plaintext 1520, beyond being encrypted with the transmit key 1509 using an encryption algorithm 1524 (e.g. XSalsa20) (and thus becomes ciphertext 1518) it is also authenticated. Authentication in the example embodiment is achieved by a method known to those ordinarily skilled in the art as encrypt-then-MAC'. In this process the plaintext 1520, having been encrypted creating the ciphertext 1518 is authenticated along with what is commonly known as the AAD (additional authenticated data), such as: the context label 1510, the value of the counter 1516 (signifying the n hash ratchet derivations of the message transmit key 1509 that have occurred to encrypt the plaintext), and the packet header 1522. Using a Message Authentication Code (MAC) 1521, which may be computed from (e.g. using the Poly1305 algorithm as standardised by RFC 7539) from the ciphertext 1518 and the aforementioned AAD using the transmit key, a MAC tag is appended to the ciphertext within the packet prior to transmission (as per RFC 7539).

The user transmits a packet, containing the counter 1516, ciphertext 1518, context 1510 and a corresponding MAC tag 1523 to the contact, and a copy to the user's own TTDM via the counterpart application. Both the user's and contact's TTDM upon receipt verifies the MAC tag 1513, and if authentication is successful, proceeds to decrypt the ciphertext 1518 and reveals the received plaintext 1520 contents and ratchets forward the hash counter iteration 1517 in order to prevent replay attacks. To provide forward secrecy each time, an authenticated ciphertext packet is sent, the counter 1517 within the input module ratchets forward the hash counter, and the TTDM upon receipt ratchets up its corresponding hash ratchet counter 1516 ratchets forward a corresponding amount of iterations. The contact's TTDM upon receipt of the authenticated ciphertext data packet also ratchets up its hash counter to account for each key received.

Physical Embodiments

FIGS. 11-19 illustrate a number of exemplary physical features of the auxiliary device.

Figure 11:
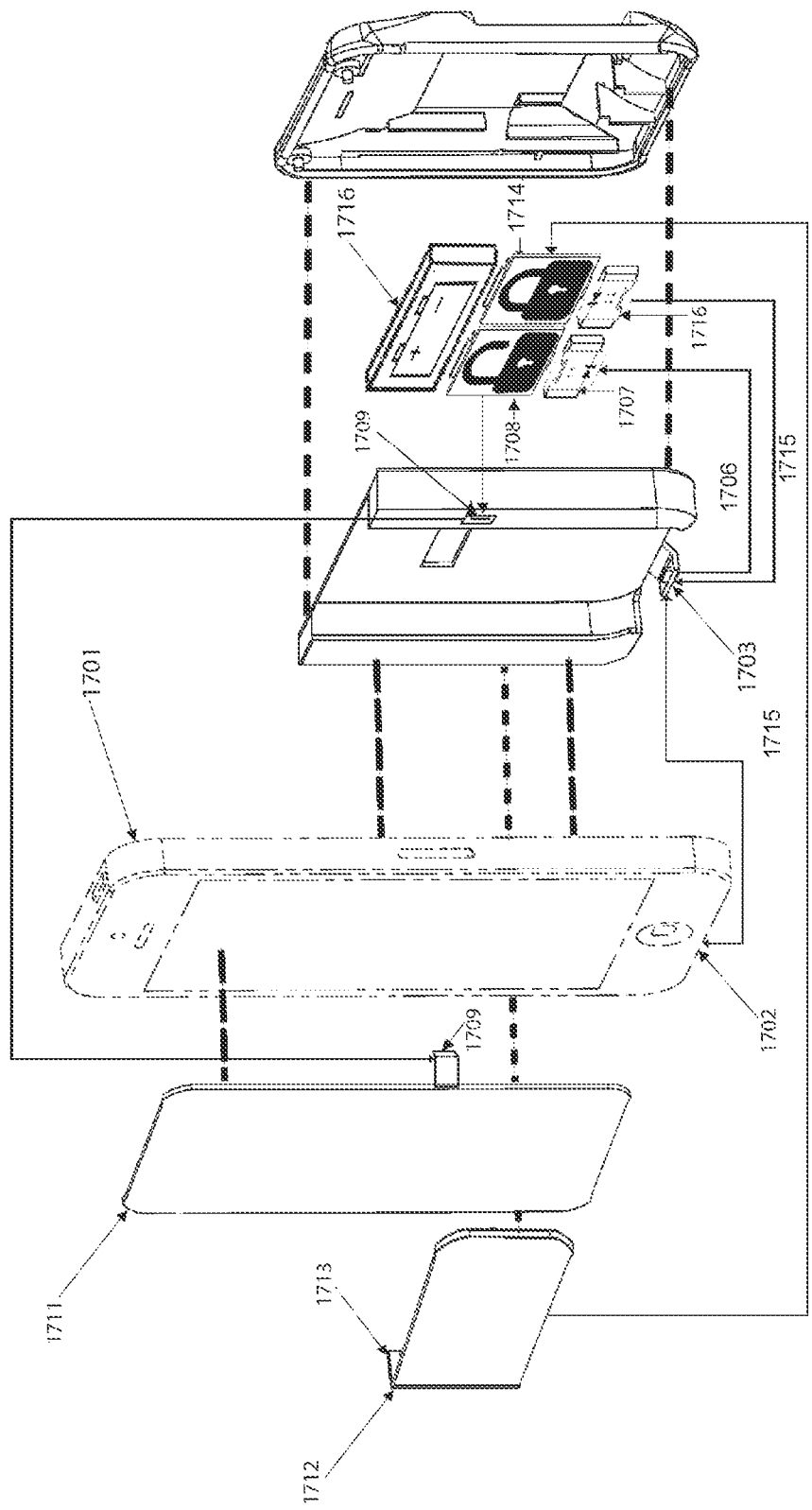
FIG. 11 illustrates an exploded isometric view of an exemplary auxiliary device attached to an electronic communication device.

FIG. 11 is an isometrically expanded overview perspective of one particular embodiment of the present invention.

The communication device 1701, when using its data connector socket port 1702 that is connected via the auxiliary device connector 1703, the communication device 1701, upon receiving relevant data (e.g. from the counterpart application residing thereon), the communication device via the counterpart application routes the said received data 1706 through the connector 1703 whereupon said received data 1706 (e.g. created on the input module of a contact and transmitted over a communications network such as the internet) upon reception by the recipient's counterpart application residing on communication device 1704, is routed through the data connector socket port 1702 of the communication device 1701 to the auxiliary device's connector 1703. From the auxiliary device's connector 1703 the received data 1706 is capable of traversing only through the (receiving) unidirectional data module 1707. From there the received data 1706 will be decrypted by the decryption module 1708 whereupon the unencrypted plaintext will via the TTDM connector 1709 connected to the connection port 1710 continue onward (e.g. for display) on the TTDM 1711.

Similarly, FIG. 11 illustrates the input module 1712, here supported by a support unit 1713. Within the support unit 1713 internal data connections (not pictured) transmit data inputted and sent by the user interfacing with the input module 1712 only to the encryption module 1714. Once encrypted, encrypted data 1715 is only capable of being transmitted via the (transmission) unidirectional data module 1716, as it is the only unidirectional data module 1716 connected to the transmission element of the of the encryption module capable 1714 of itself receiving data from the input module 1712.

The resultant encrypted data 1715 is transmitted via the auxiliary device's connector 1703, and the communication device's socket port 1702 to be received by the counterpart application.

Power for the auxiliary device 1701 is drawn from the included rechargeable battery 1716 via an internal power bus to provide power to the auxiliary device 1701, and to the external connector for the power/data 1703.

Exterior

Figure 12B:
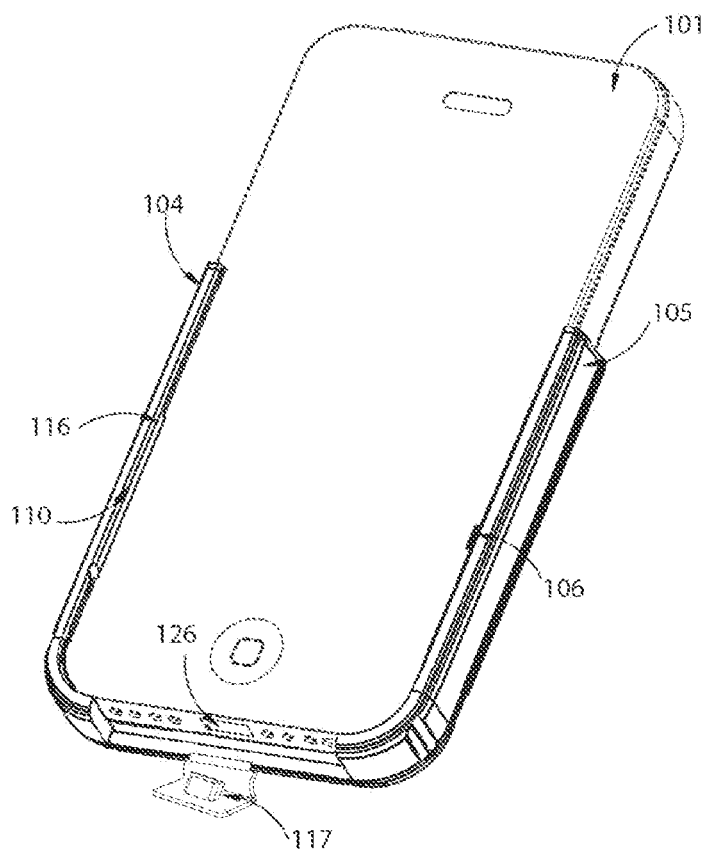
FIG. 12B shows an isometric view of the exterior appearance of the exemplary auxiliary device of 12A attached to an exemplary electronic communication device.

FIGS. 12A and 12B depict embodiments of an auxiliary device 100 that can be connected to a communication device 101. In FIG. 1A the auxiliary device in 100 comprises a communication base 125 itself comprising a backpiece 102 designed to attach to the rear of the communication device 102 when the communication device is inserted between the set of elevated sidewalls 104, 105 connected to the aforementioned backpiece 102 said sidewalls configured to elevate above the height of the communication device once the communication device is attached between them; and said elevated sidewalls further comprising overhanging grippers to fasten the communication device 101 to the auxiliary device base 125.

In certain embodiments the exterior materials of the auxiliary device base 125 may be made from plastic, aluminium, carbon fibre, or materials rigid enough to firmly hold the communication device 101. Alternatively, the auxiliary device base 125 may comprise a sleeve into which the communication device 101 can be inserted. Openings configured in the auxiliary device base 125 may be provided to maintain user access to buttons or other input and output options of the communication device 101.

In FIG. 12A the communication device 101 is shown detached from the auxiliary device base 125. In contrast, FIG. 12B depicts the communication device 101 placed within the auxiliary device base 125 and coupled to said auxiliary device 100 via a data connection 117 that may comprise the additional capability of providing and receiving power between the communication device 101 by connection to the communication device's input port 126 and the auxiliary device base 125.

In the depicted embodiment the two opposing elevated sidewalls disposed to the backpiece 102 comprise an enclosure into which the communication device is secured. The backpiece itself houses a hollow internal space 102 designed to be contiguous with the internal space of one of these elevated sidewalls. The input module, in its retracted position, is configured to partially inhabit the internal space of the contiguous elevated sidewall with the remainder accommodated by the backpiece 102. A lip handle disposed to the input module is configured to protrude through an opening aperture in the contiguous elevated sidewall allowing for user extension of the input module across the communication device. The contiguous elevated sidewall further comprises a support unit configured to both extend and retract in tandem with the input module, in this way maintaining separation between the input module and the input area of the communication device. The opposite elevated sidewall comprises a retaining connector configured to receive the input module and support unit and in so doing to maintain full extension of the input module across the communication device.

Persons skilled in the art will appreciate the maintenance of a gap between the input module 111, the communication device display 114 and, or the transparent touch display module 103 may be required only insofar as a risk exists of a user's inputs received at the point of input module being passed through to the touch transparent display module 115 and, or the communication device 114 beneath the input module 111 as a by-product or inadvertent application of pressure applied to the input module 111 by a user when utilising the input module 111. In embodiments wherein the communication device display 114 is not a touch screen, and, or the transparent touch display module 115 does not extend beneath the input device 111, the input device 111 may be flush, or otherwise be in contact with the communication device 101.

Figure 13A:
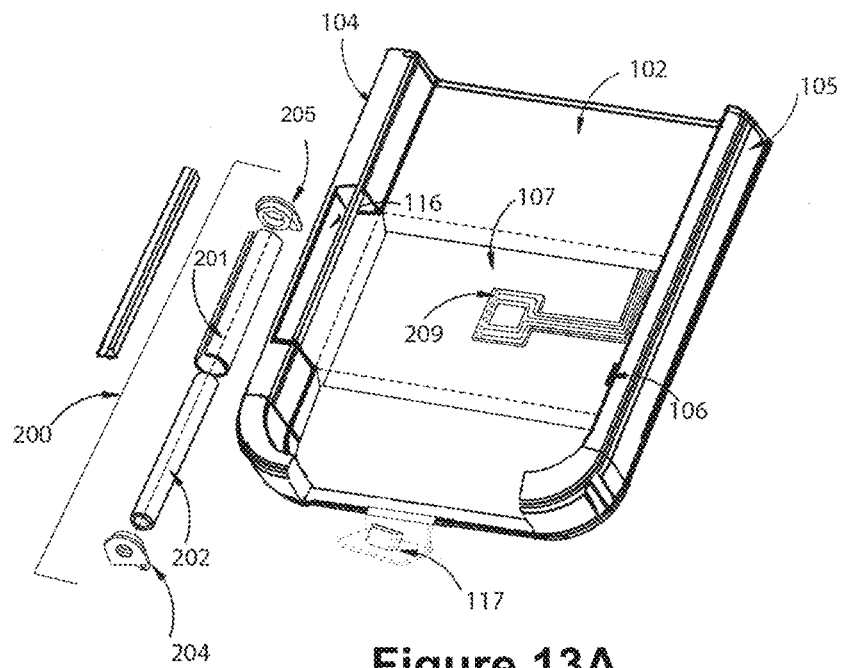
FIG. 13A shows an exploded isometric view of an exemplary auxiliary device in which a retraction unit allows an input module to traverse within the auxiliary device housing.
Figure 13B:
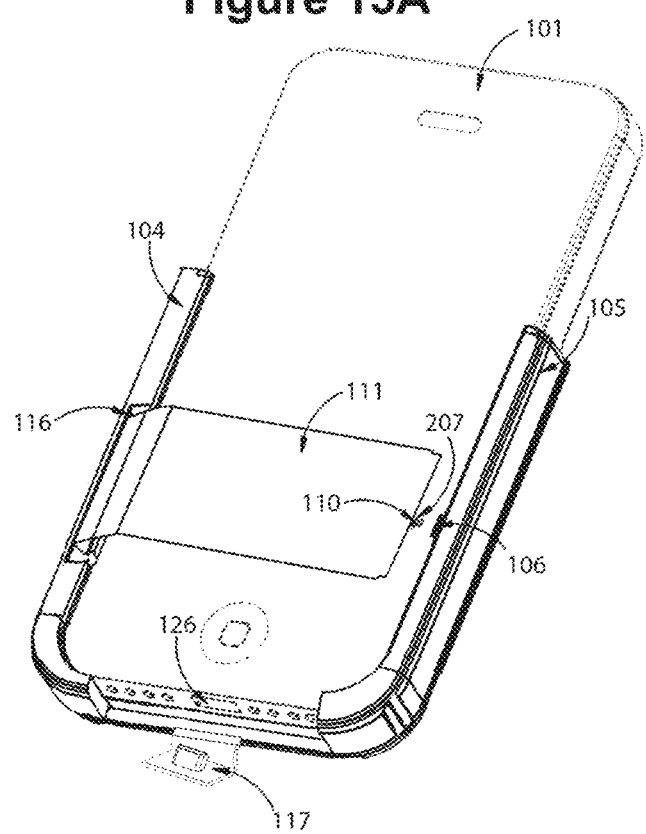
FIG. 13B shows an isometric view of the auxiliary device of 13A in which the input module is in an unrolled position.

The internal housing space 107 of the backpiece 102, the contiguous internal space of the elevated sidewall 104 and its opening aperture 116 may be machined, moulded, cut or otherwise fashioned as individual or contiguous pieces.
Retraction Unit FIG. 13A illustrates a preferred embodiment of a retraction unit 200 that may allow an input module 111 (see FIG. 13B) to traverse within the internal housing space 107. In this embodiment the retraction unit 200 comprises a retraction assembly 201, said assembly comprising a central cylindrical rotary member 202 which functions as a spool for the input module, the outer circumferential surface of said rotary member allowing for the input module (not pictured, see FIG. 13B), which in this embodiment is manufactured from a sufficiently flexible material, to roll therearound or be unrolled therefrom. Within the internal housing space 107 the input module 111 is during traversing within the retraction assembly 201 connected to an FPC (flexible printed circuit) 209 that itself is connected to the input module backpiece 102. Hinge caps (204, 205) hold the retraction unit 200 in position inside the internal housing space 107.

Figure 14:
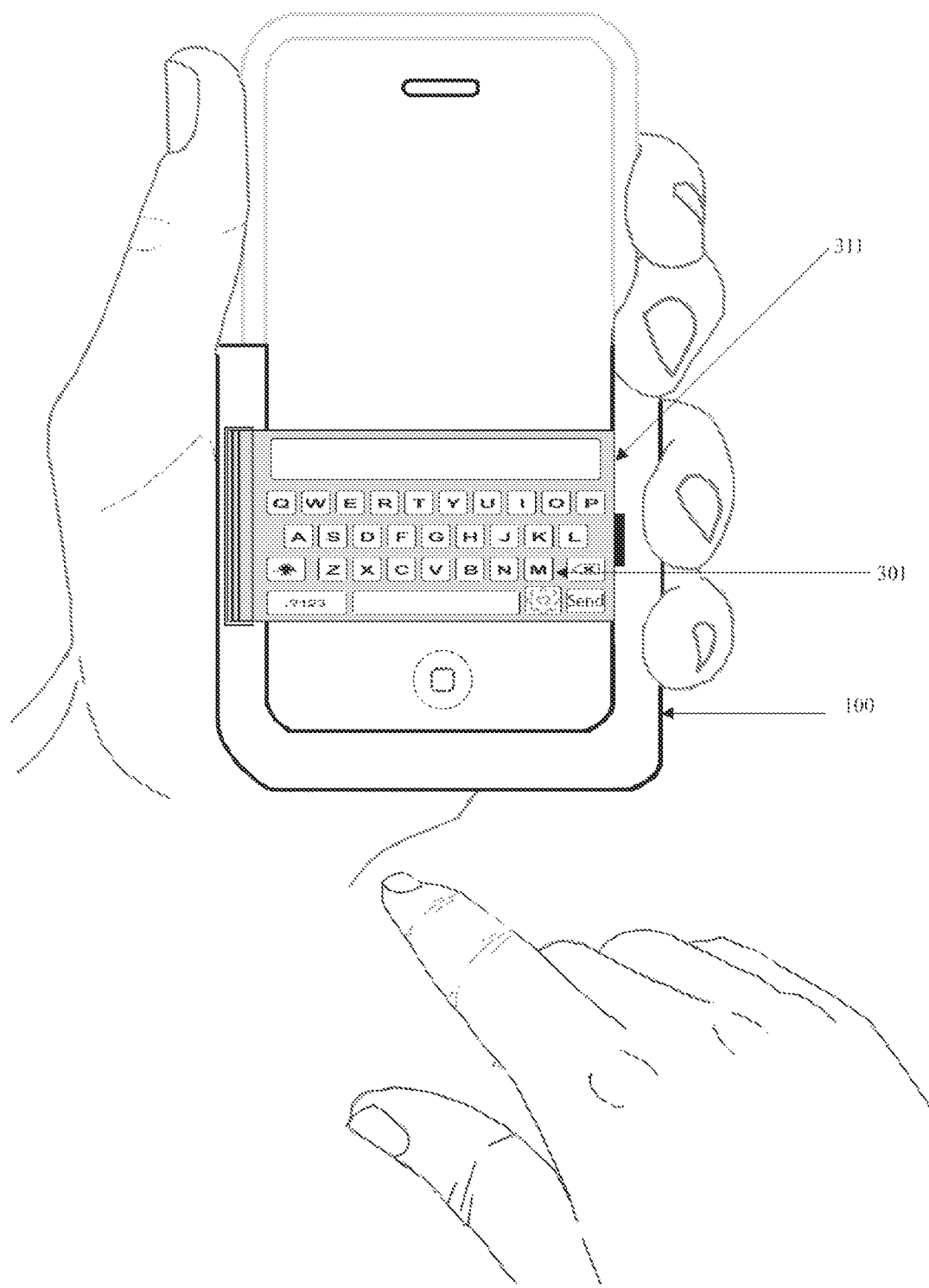
FIG. 14 illustrates schematically a user interacting with an exemplary input module.

Persons skilled in the art will appreciate that retraction unit 200 need not be included within an internal housing space 107. Rather, a portion of housing 107 may open up such that the input module 111 may be folded or put away. For example, a housing portion on may act as a door (not pictured) that is hinged on the elevated housing sidewall 104.
Input Module FIG. 14 shows one embodiment of an input module 311 and in particular that the input module 311 may include any number of flexible control inputs 301. In one embodiment this may be implemented using touch screen electronic paper technology to, for example, reduce energy consumption and unit cost. However, persons skilled in the art will appreciate that numerous types of input implementations may be provided for in accordance with the principles of the present invention. Technologies which allow for thin display screens and touch sensitive capabilities such as liquid crystal display (LCD), organic light-emitting diode (OLED) or electroluminescent display (ELD) technologies may be implemented in other embodiments of the present invention. The flexibility of the input module 311 in this embodiment can allow it to be coupled to a flexible printed circuit (FPC) unit (see FIG. 13A), so as to allow both the input module 311 and the FPC (see FIG. 13A) to potentially retract and extend from the retraction unit 300. The input module 311 in the specific embodiment may be a keyboard, numerical pad, or otherwise act as a button or series of buttons allowing the user to input data into the input module 311, the input module 311 being in communication with a processor (not pictured) which stores the inputted data on the auxiliary device 100

The flexible control inputs may be receptive to the presence and position of a touch input. For example, a user can utilize the input module 311, displaying flexible control inputs 301 to input data using a stylus pen, the user's finger, or the like. The input module 311 can be formed of a transparent material.

In addition, the input module 311 may generate input data input by a user to control the operation of the auxiliary device 100. The input module may include a keypad, a dome switch, a touchpad (e.g., resistive/capacitance configurations.)

Those skilled in the art will appreciate that data displayed on the input control 301 of the input module 311 may be data provided to and in response from the data processors and controllers (not pictured) within the auxiliary device 100, and that data may be sent to and received from such processors and controllers via PCB units (not pictured) coupled to the input module 311. FPCs may be connected to the input module 311, which in turn may be connected to the processors and controllers of the auxiliary device 100.

Referring to the flexible printed circuit board (FPCB) which connects the input module with the unidirectional data module: a ground and transmit connector formed on the FPCB each respectively connect to the unidirectional data module's 'pin-in(s)' for ground and transmit. The unidirectional data module's circuitry, after the unidirectional element(s), has corresponding 'pin-out(s)' for onwards transmission to the receiving side of the auxiliary device connector port/socket, the connector port/socket being connected to the communication device. Similarly, the ground connection will be grounded against the FPCB of the auxiliary device connector port/socket.

The grounding wire could include an upper ground layer and a lower ground layer formed of a thin copper coating layer on the front surface and back surface of the FPCB.

Data lines, and ground lines of the FPCB, and connections thereof may also be made of a copper conductor.

Referring to the TTDM; a ground line from the TTDM's FPCB exists connecting the TTDM's FPCB to the electronic circuit board of the unidirectional data module connection unit's ground, each respectively connecting to the second electronic circuit board of the unidirectional data module's connector's 'pin-out'. Additionally, the TTDM's FPCB is connected by a receive connection 'pin-in' that is correspondingly unidirectional data module's electronic circuit board's 'pin-out', which itself receives data information—after its unidirectional elements—from the corresponding 'pin-out(s)' of the FPCB of the expansion device connector port/socket which will be connected to the communication device.

It should be obvious to those skilled in the art that there is at all time sufficient accommodation for electrical power for each component to function.

Support Unit

Figure 15A:
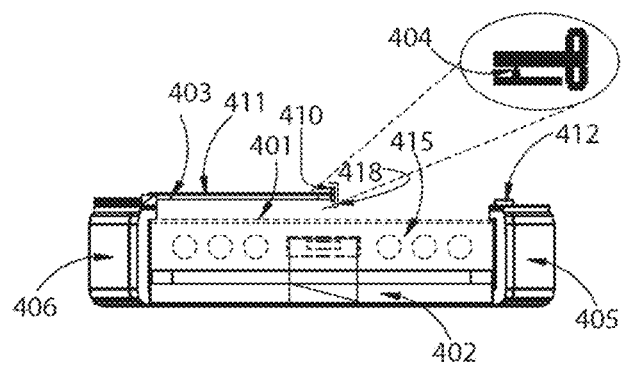
FIG. 15A illustrates schematically an embodiment of the invention in which a support unit provides support to an input module.

FIG. 15A illustrates an exemplary support unit 418, configured to maintain the separation between the input module 411 and the input area 401 of the communication device 415 and to ensure that the input module 411 remains suitably flat and rigid during extension and once extended and connected to the retaining connector 412. The support unit 418 is further configured to both extend and retract in tandem with extension and retraction of the input module 411 and may be accommodated within the internal housing space (see FIG. 13A) of the elevated contiguous sidewall and backpiece 402 when in the retracted position. As an example, should the user extend the input module 411 by pulling on the lip handle 410 attached to the input module 411, the lateral movement toward the retaining elevated sidewall 405 and the retaining connector 406 will concurrently pull the support unit 418 enjoined to the input module 411.

In one embodiment the support unit may comprise at least one supportive arm 403 running along the underside of the input module 411 configured to maintain the separation between the input module 411 and the communication device 415. The supportive arm or arms 403 will be disposed to the lip handle 410 and configured to extend and retract in tandem with extension and retraction of the input module 411.

Figure 15B:
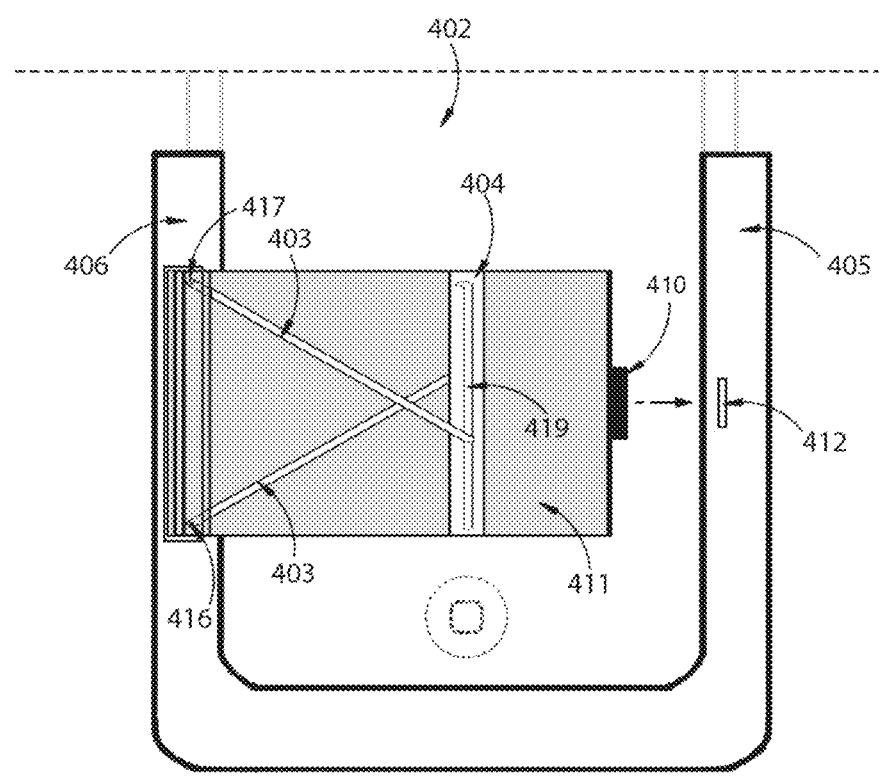
FIG. 15B illustrates schematically the auxiliary device of 15A in which the support unit and input module are extended.

FIG. 15B illustrates an example embodiment that may illustrate the support unit comprising of interlocking arms as support arms 403 attached to a frame guide 404 via the track grooves 419 similarly disposed to the interlocking arms support arms 403 attached to a series of rotatable hinges 416 and 417 and configured to extend with extension of the input module 411 and collapse into a folded state on retraction, allowing the interlocking arms support arms 403 to traverse the track groove 419 as the input module 411 is extended or retracted.

The support unit 404 linkage to enable movement in-tandem with the input module 411 may comprise magnets, hooks, fasteners, clip handles, screws, pins, connectors, latches or recesses within the support unit 418 configured to catch the lip handle 410 when the user pulls out the input module 411, and, conversely, to retract when the user pushes the input module 411 back into place.

Hinged Support Unit

Figure 16A:
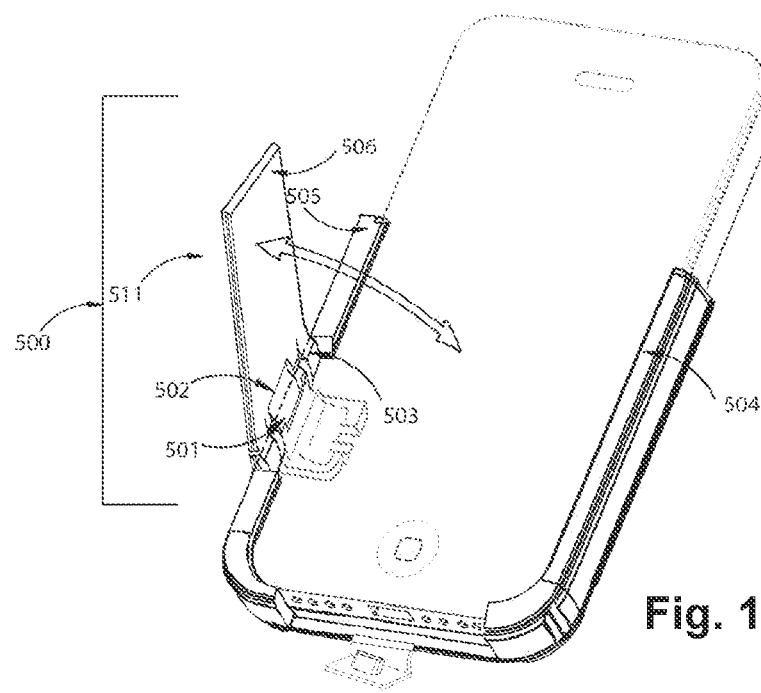
FIG. 16A shows an isometric view of an exemplary auxiliary device in which the support unit and input module are hinged.
Figure 16B:
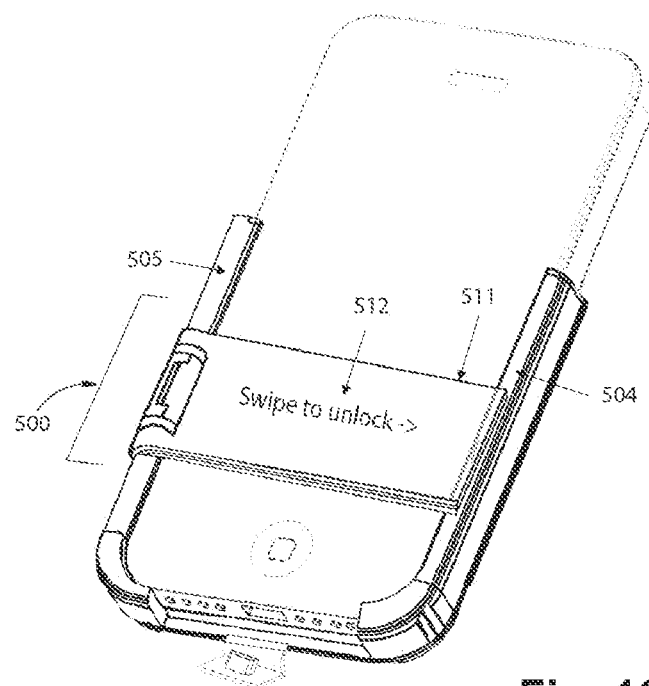
FIG. 16B shows an isometric view of the auxiliary device of 16A in which the support unit and input module are in a lowered position.

FIG. 16A illustrates an alternative embodiment for a hinged support unit 500, the hinged support unit 500 comprising at least one hinge and a reinforcement sheet 506 configured to support the rigidity of an input module 511 which can rotate via said hinge or hinges from the rear of the auxiliary device base 125 (See FIG. 12A) to its front, in which position the reinforcement sheet 506 rests atop the elevated sidewalls 504, 505 and therefore separate from the input area of the communication device 115 (See FIG. 16B).

In this exemplary embodiment the support unit comprises a central hinge 501 and auxiliary hinge 502 connected respectively at the inferior and superior aspects of a central structure 503 disposed to the elevated sidewall of the auxiliary device, said central hinge 502 connecting the central structure 503 to the auxiliary device 125 at the base of the elevated sidewall 504 and said auxiliary hinge 502 connecting the interposing central structure 503 to the reinforcement sheet 506. The central hinge 501 allows for the rotation of the central structure and reinforcement sheet 506 to lie behind the auxiliary device base 125; and the auxiliary hinge 502 allows for rotation of the reinforcement sheet to lie atop the elevated sidewalls once the central hinge 501 is rotated to its 180-degree position.

The embodiment may further comprise a central 503 structure affixed to the elevated sidewall 505 of the auxiliary device base 125 with a central hinge 501 at its superior aspect, said hinge connecting the central structure 503 to the reinforcement sheet 506, with an auxiliary hinge 502 located at a position along the reinforcement sheet 506 equal in length to the height of the elevated sidewall 505. This configuration would therefore allow for 270-degree rotation of the reinforcement sheet 506 from its engaged position to lie parallel the elevated sidewall 504, with the auxiliary hinge 502 facilitating the 90-degree rotation of the section of reinforcement sheet 506 distal the auxiliary hinge 502 to lie parallel the backpiece 102, with the proximal remainder of the reinforcement sheet 506 remaining parallel the elevated sidewall 505.

Technologies in visual displays allow for the folding of the overlying input module required for this embodiment.

FIG. 16B illustrates an instance in which a user has engaged the hinged support unit 500 with the input module 511 displaying an example of an input control 512 once fully rotated in a position so as to rest atop the elevated sidewalls 504, 505.

Retaining Mechanism

Figure 16C:
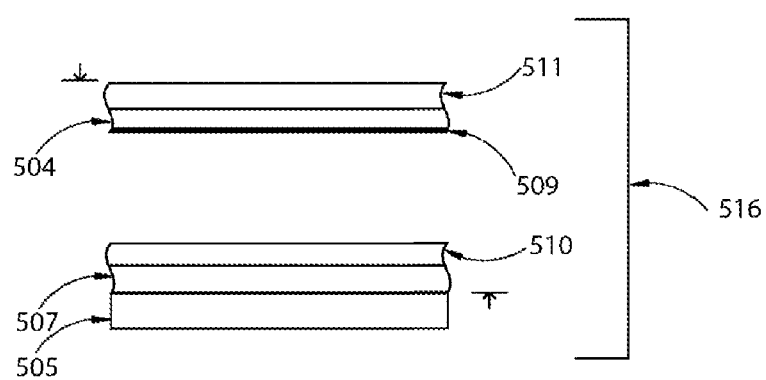
FIG. 16Ca illustrates schematically an exemplary auxiliary device in which a retaining connector mechanism can be coupled with the elevated retaining sidewall.
Figure 16C:
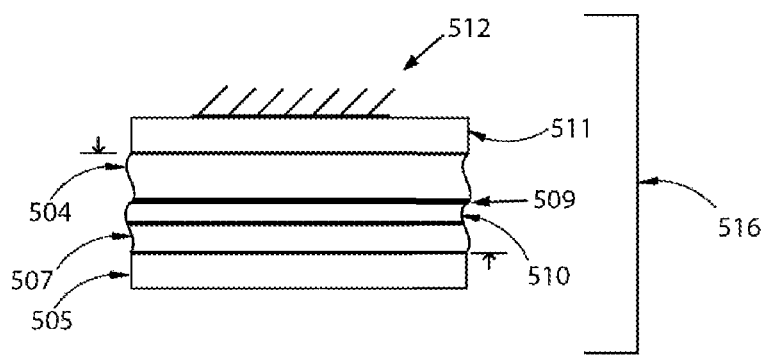

FIG. 16Ca illustrates one possible embodiment of a retaining connector mechanism 516 in the process of being coupled to the elevated retaining sidewall 505, said retaining connector including a sensor 507 allowing for the detection of the lip handle 510 (above, not making contact) upon connection. This sensor being configured to activate the input module 511 and outputting input control(s) 512 once the lip handle 510 has been sufficiently made contact with the retaining connector 506 as illustrated in FIG. 16Cb.

An effective retaining connector mechanism 516 may comprise a magnetic element 509 within the reinforced sheet 506 with a corresponding magnetic element 510 positioned onto at least one of the elevated sidewalls 504, 505 and thereby configured to hold the reinforced sheet 506 both above and parallel to the face of the communication device input area (see FIG. 15A). Advantageously, a magnetic retaining mechanism is capable of securing the hinged support unit in the open (and/or closed) position without the need of a cut-in, reciprocal detents, adhesives, internal divots, fasteners or engaging grooves (not pictured) that would require additional elements well known in the art.

Figure 16D:
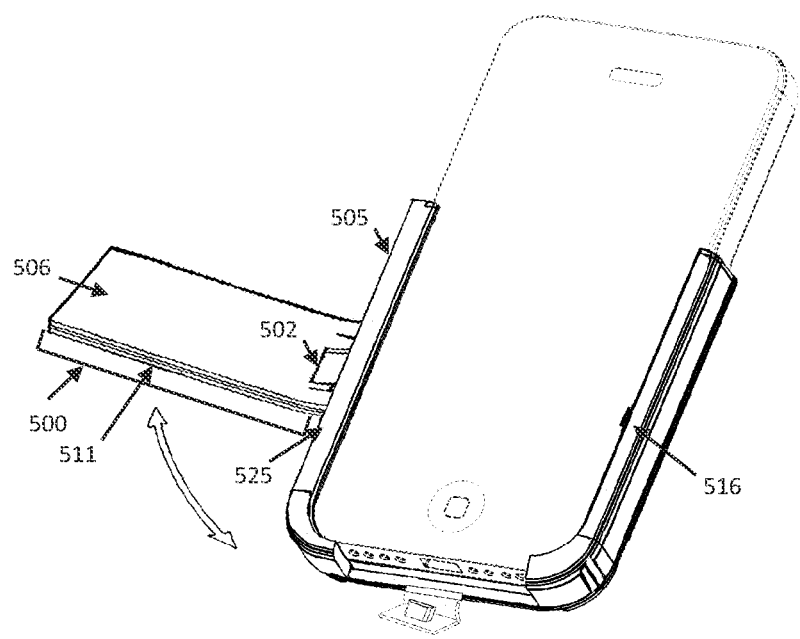
FIG. 16D shows isometric views of an exemplary auxiliary device featuring a hinged support unit in an open position.

FIG. 16D illustrates the hinged support unit 500 and in particular the rotation of the hinged support unit 500 in more detail. Illustrated therein is one possible means of disengaging a retaining mechanism 516 (FIG. 16C) for the reinforcement sheet 506, the retaining mechanism 516 in this example being magnetic, in which a user applies sufficient pressure to the opposing non-hinged aspect of the reinforcement sheet 506, in so doing disengaging magnetic contact between magnetic elements attached to the elevated sidewall 505 and the reinforcement sheet 506, therefore allowing for rotation at the auxiliary hinge 502 and in some instances, creates a pivot point through the auxiliary hinge portion 502.

Figure 16E:
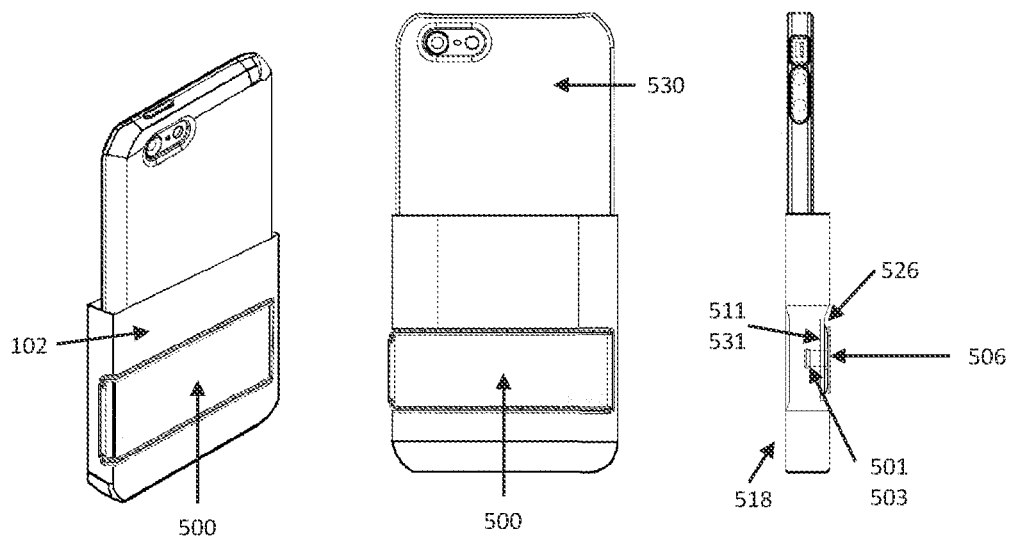
FIG. 16E illustrates schematically the auxiliary device of 16D with the hinged support unit being folded for storage.

The auxiliary hinge portion 502 may generally position itself along one of the sides of the auxiliary device base 525 so as to be substantially parallel across the face of the two elevated sidewalls 504, 505, in order to facilitate 180-degree rotation of the attached reinforcement sheet from its retained position outwards, effectively causing the input module 511 and input control 531 to face downward (See FIG. 16E).

FIG. 16E illustrates the hinged support unit 500, and in particular, shows the hinged support unit 500 when folded for storage whereby the movement of further rotation of the hinged support unit 500 in FIG. 16D has completed via rotation of the central structure 503 and attached reinforcement sheet 506 around the central hinge 501 connecting the lower part of the structural module 503 to the base of the elevated sidewall, thereby allowing central structure 503 and reinforcement sheet 506 to be retained at the backpiece 102 of the auxiliary device base 525. The dimensions of the reinforcement sheet 506 and central structure 503 may vary according to the respective width and height of the auxiliary device base 525.

The user may rotate the reinforced sheet 506 to place it within a rear housing space 526 in the auxiliary device base 525. In the illustrated example the auxiliary device base 525 also contains a magnetic element 509 corresponding to the magnetic element on the reinforced sheet 506 thereby allowing for its retention in the rear housing space via magnetism. Conversely, enough force or manipulation applied to the reinforced sheet 506 outwards by a user may allow for disengagement of retention from the rear housing space within the auxiliary device base 525.

The preferred embodiment shows the reinforced sheet 506 supporting the input module 511 so that the control inputs (See FIG. 14) of the input module 111 face toward the front of the auxiliary device 518 when housed within the rear housing space 517, thereby allowing the rear of the reinforced sheet 506 to face outwards from the auxiliary device base 525 and thereby protecting the control inputs (See FIG. 14) from damage or inadvertent engagement when the auxiliary device 500 or communication device 530 is being held by a user.

Persons skilled in the art will appreciate that various other retention mechanisms may be exploited in addition to magnetic force, for example a clip or fastener mechanisms utilising internal divots or dimples may be more appropriate, such that an additional sliding force may be applied to enable connecting members (not pictured) on the reinforced sheet 506 to slide into engagement slots or corresponding divots (not pictured) within the rear housing aperture 517 when stored, or on the elevated sidewalls 504, 505 when deployed. The connecting members may include extensions that engage the divots or dimples to further facilitate a retaining engagement.

Transparent Touch Display Module (TTDM)

Figure 17:
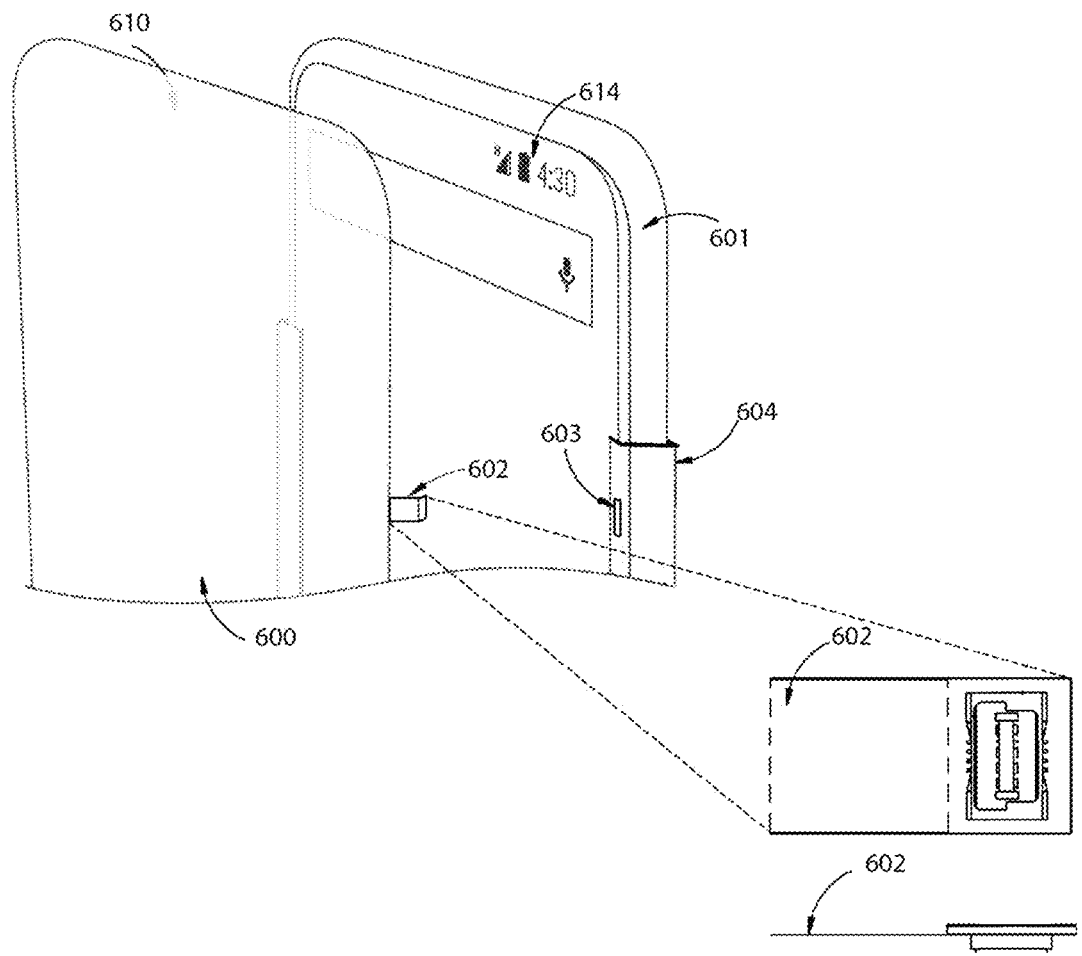
FIG. 17 illustrates an exemplary auxiliary device where the transparent touch display module is attached to the auxiliary device body by a flexible printed circuit board.

FIG. 17 shows one embodiment of a transparent touch display module (TTDM) 600. Particularly, FIG. 17 illustrates an embodiment of the display module that can be configured to be transparent, such that it is possible to see the objects therethrough. These displays may be called transparent displays. A representative example of the transparent display may include a Transparent Organic Light Emitting Diode (TOLED), and the like, to which in addition, the TTDM 600 may be configured so as to detect a touch input pressure as well as touch input position and touch input area. Further, in this specific example embodiment, the TTDM 600 is configured to substantially overlap the communication device display 614 of the communication device 601. The communication device display 614 in the embodied example may be implemented using typical implementations known in the art, this for example, may be a Liquid Crystal Display (LCD), a Thin Film Transistor-Liquid Crystal Display (TFT-LCD), an Organic Light-Emitting Diode (OLED), a flexible display, a three-dimensional (3D) display, or the like.

For example, the TTDM 600, or other transparent or light-transmissive display may be configured to enable an external environment, such as the communication device display 614 to be seen through, enabling a user to see an object located behind the TTDM 600 through the area occupied by the communication device display 614.

Although the TTDM 600 can be of any shape, in the preferred illustrated embodiment, they are preferably sufficiently rectangular to conform to the shape of a typical communication device 601, of which most possess largely rectangular dimensions. In particular, the shape of the TTDM 600 may not be exactly rectangular as corners may be rounded in order to protect a variety of communication device displays 614, some which may also have physical buttons inappropriate for the TTDM 600 to overlap, requiring the need for skirting designs. The nature of the TTDM 600 and its design enable specific embodiments to be adapted to conform to the communication device display 614 of any such device.

In a preferred embodiment the TTDM 600 is coupled to an FPC connector 602 configured to exude from one side of the TTDM so as to be insertably connected to a corresponding data socket 603 located on the auxiliary device 604 for example on an elevated side wall 106. The data socket 603 may comprise imbedded internal circuitry that further connects to the auxiliary device 604 processors and controllers to transfer and receive data (to and from) the TTDM 600, thereby connecting the auxiliary device base 604 and the TTDM digitally and electronically.

The TTDM FPC connection 602 to the data socket 603 may assist with positional overlap alignment above the communication device display 614, while the retention of the TTDM 600 to the communication device display 614 may be achieved by an adhesive 610 pre-applied the rear side of the TTDM 600 so that the TTDM 600 may bond to the communication device display 614. The adhesive may adhere to the communication device display 614 or may include pressure bonding and/or temperature bonding in in some instances. The pre-applied adhesive 610 itself may be protected from unwanted exposure and/or contact through the use of a backing film (not pictured) to maintain adhesion prior to the installation of the TTDM 600 to the communication display device 614. The adhesive 610 is typically transparent or clear, and its application to the TTDM 600 may span the entire surface area or an outer perimeter. Once bonded to communication device display 104 the adhesive is sufficiently unnoticeable. The strength of an adhesive prevents the film TTDM 600 from peeling away.

Alternatively, in instances whereby it is unsuitable for adhesive 603 to be directly applied to the TTDM directly the TTDM 600 may instead be placed in a sufficiently clear sleeve (not pictured) made of film, plastic, or other transparent material of the like.

Touch input applied to the TTDM 600 by the user may by captured by a transmission-type photoelectric sensor, a direct reflection-type photoelectric sensor, a mirror reflection-type photoelectric sensor, a high-frequency vibration-type proximity sensor, a capacitive proximity sensor, a magnetic proximity sensor, an infrared proximity sensor, and so on. Touch screens (or touch sensors) may in this case be classified as forms of proximity sensors. TTDM 600 touch sensors may be configured to detect touch using one of various touch methods including a resistive-type method, an electrostatic capacity method, an infrared method, an ultrasonic method, a magnetic field method.

Figure 17A:
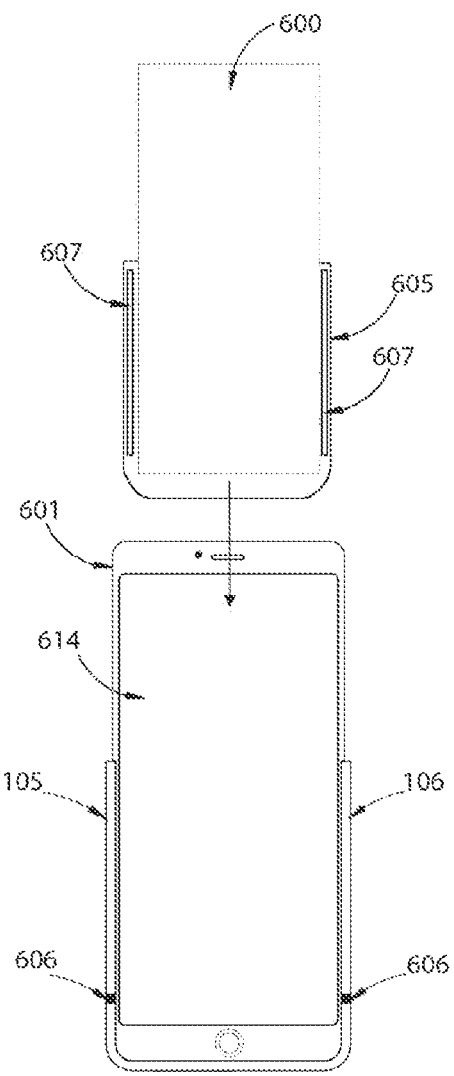
FIG. 17A illustrates schematically an exemplary auxiliary device wherein the auxiliary device is secured to the communication device using a bezel.

FIG. 17A illustrates an alternative embodiment for securing the TTDM 600 to the communication device 601 using a bezel 605. This may be preferred in instances in which, for example, the communication device display 614 may not be conducive to the application of adhesive, making adhesive generally an unsuitable element to use to secure the TTDM 600. In this instance a bezel 605 placed above the TTDM 600 and secured to the elevated sidewalls 105, 106 using, for instance, lips 606 or hooking protrusions that attach reciprocal cuts 607, may effectively secure the TTDM 600 against the communication device display 614.

Further, the bezel 605 may incorporate infrared sensors (not pictured) where it abuts the TTDM 600 to detect touch inputs in the event infrared touch is used as method of input.

White Noise Signal

Figure 18:
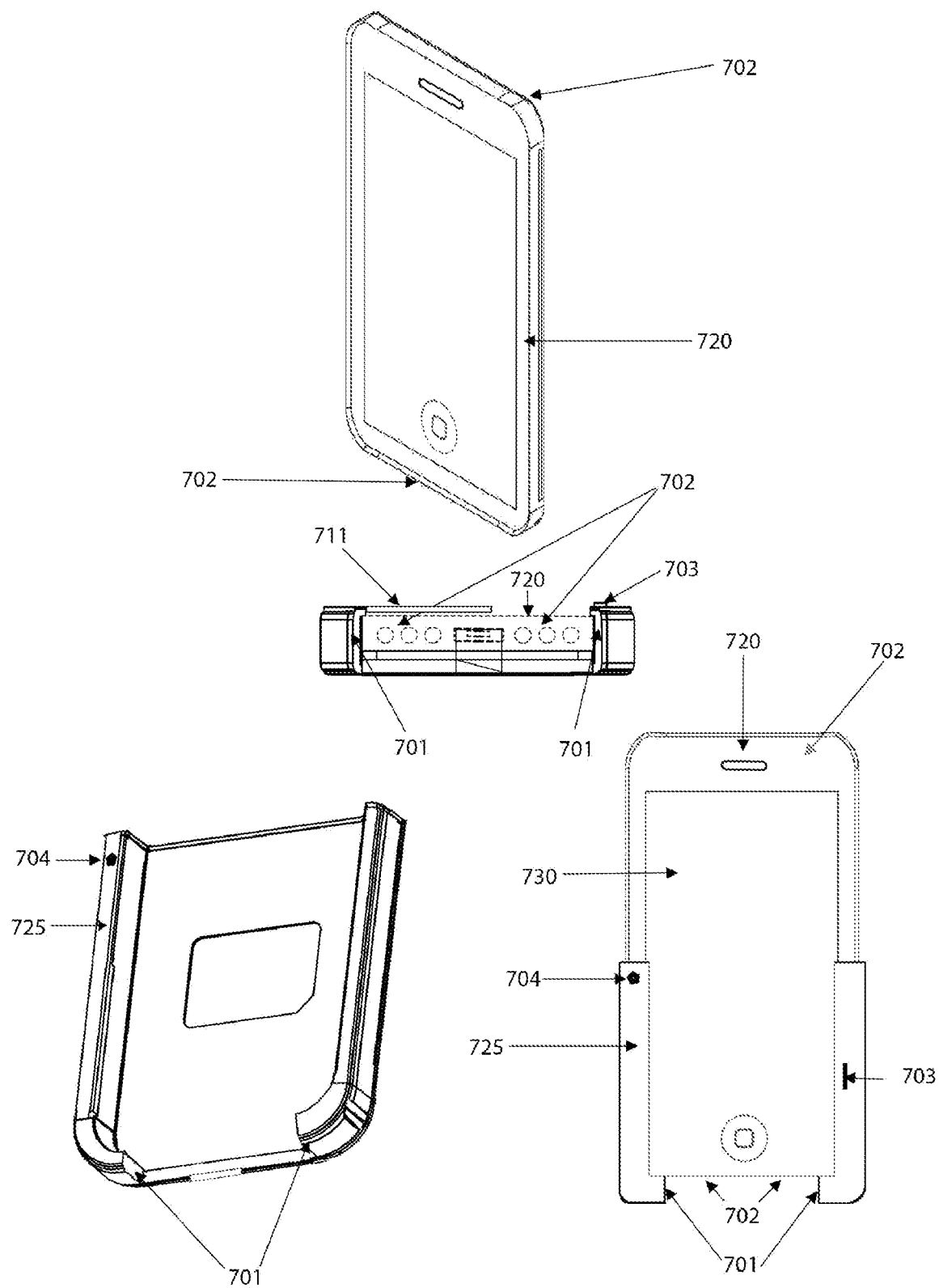
FIG. 18 illustrates schematically an exemplary auxiliary device featuring a white noise signal generator.

FIG. 18 illustrates an example of a white noise signal generator coupled to the auxiliary device 700, the white noise signal generator comprising a speaker 701, which may be in plurality, located in close proximity to microphones present on the device 702, a provided for sensor 703, which in the present embodiment is coupled to the retaining connector 106 so as to be triggered by the sufficient extension of the input module 711, a light 704, such as an LED or the like, coupled to the front of the auxiliary device base 725 and configured to display a light 704 to indicate the auxiliary device speakers 701 are broadcasting signal white noise and, conversely, to desist from displaying the light 704 when noise is not being generated.

In one particular embodiment, the sensor 703 may comprise a physical switch that detects physical pressure exerted by the input module 711 upon sufficient extension, the switch thereby triggering the sensor, which in turn instructs a processor (not pictured) to transmit data to the transducer (not pictured), the transducer configured to isolate and transduce the noise signals to a frequency sound beyond that of human hearing, such as ultrasonic—for reference ultrasonic is a range approximately between 19 kHz—25 kHz—wherein the said noise signal is transmitted to the speakers 701. The speakers 701, in turn broadcast said noise, which, while inaudible to the user is nonetheless within the audible range of a communication device's microphone or microphones 702, which, combined with close proximity of the auxiliary device 700 to the communication device 720, obscures ancillary sound that may be created while a user is interacting with the input device 711. Such ancillary sounds, such as tapping sounds produced as a consequence to applying touch pressure during the formation of message data, or the like, may constitute a form of data leakage as the unintended consequence of capturing said sound produced by user interaction with the touch panel of the input device 711 can inadvertently determine a messages' contents or other data through analysis of sound produced as well as length of time between taps, keystrokes or the like.

A compromised microphone on a communication device 720 thus necessitates such a signal noise generator to maintain user confidentiality and privacy in such circumstances, however only when necessary. It is envisioned that a communication device 720 may require use of an unobscured microphone 702, such as during the making and receiving of voice calls. Therefore, in the present embodiment the activation of the signal noise generator 700 is associated to coincide with the sufficient extension of the input module 711, to protect the inputting of such data as and when required and deactivate upon the sufficient retraction or withdrawal of the input module 711.

One exemplary use includes the use of the light 704 as an indicator to the user that it is safe to begin tapping, or otherwise inputting data into the input module 711, or into the TTDM 730 as the light 704, which is located on a front position that is visible to the user, when illuminated, indicates that the speakers 701 are broadcasting a noise signal sufficient to impair the communication devices' microphone(s) 702 and its/their ability to capture sound and thereby obscuring ancillary sound input data from leaking to the communication device 720. Similarly, the lack of an illuminated light 704 indicates to a user that the speaker 701 is inactive, and accordingly the communication device microphone(s) 702 are thus unobscured and capable of potentially capturing sound within range.

In certain other embodiments, the light 704 may vary in colour, and/or may blink at differing rates, and/or a combination thereof as a diagnostic indicator, depending on a number of potential events; examples may be to indicate to the user that the sensor 703 has detected that there has been a lapse in sufficient extension of the input module 711, or there has been a lapse in sufficient retraction thereof, a speaker 701 malfunction, or sensor 703 obstruction.

It must be noted that those skilled in the art will appreciate that frequencies beyond ultrasonic tone possessing the dual chrematistics of being both inaudible to human hearing and audible to microphones within range can be utilised. In addition to the obstruction of user generated ancillary input data, obstruction of other sounds from reaching the microphone 702 of the communication device may be necessitated, such as voice and the like. This embodiment does not preclude optional activation and deactivation buttons, switches, or digital methods to manually enable or disable the signal noise generator should the need arise.

Input Module Optical Device

Figure 19A:
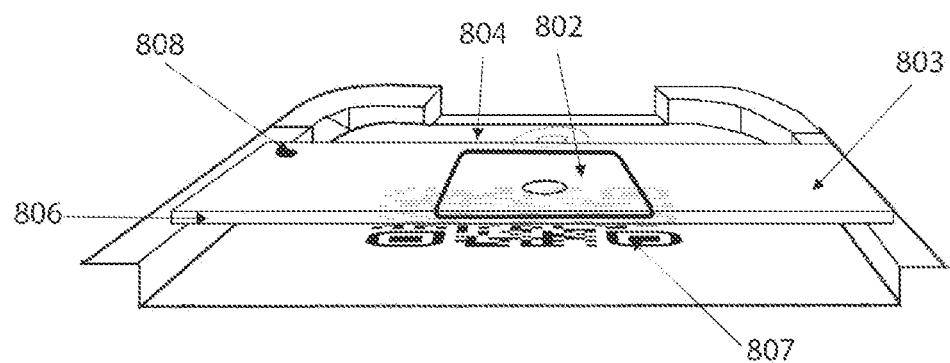
FIG. 19 illustrates schematically an exemplary auxiliary device in which an optical device is attached to the input module.
Figure 19B:
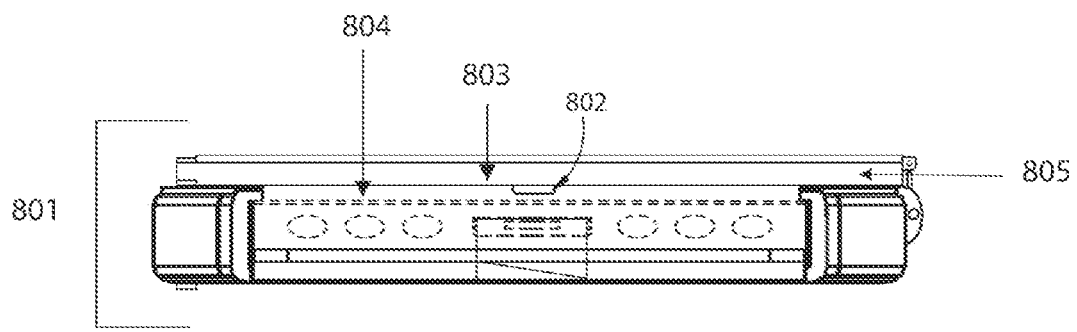

FIGS. 19A and 19B respectfully show isometric and sectional views of an embodiment of an auxiliary device 801 in which an optical device 802 is positioned on the underside of input module 803. The optical device 802 may comprise a camera, scanner or other device capable of optically receiving information. In this embodiment the previously described reinforcement sheet (FIG. 15) 805 may retain the optical device 802 so as situate the optical device 802 securely to the underside of the input module 803. The optical device 802 can be configured to capture an area beneath it, such as the display of the TTDM 804. The TTDM 804 may be displaying information or data. Said information or data displayed by the TTDM 804 may be captured by the optical device 802 if the user deems it desirous for the optical device 802 to capture it.

For example, the optical device 802 may capture data displayed by the TTDM 804 when triggered using a physical button or switch 808 as activated by a user, which may be necessitated as there is no direct connection between the TTDM 804 and the input module 803. The physical button or switch 808 may be disposed to the display of the outer edge of the input module 803 enabling the user to activate the optical device 802 from the input module 803 area.

Alternatively, and, or through the use of a command that a user may control through a user interface on the input module 803, the optical device may be configured to capture the area beneath it when the aforementioned command is issued by the user through the user interface on the input device module 803. In another embodiment, the optical device may be configured to autodetect specific data or patterns, such as QR codes 807 or barcodes or the like, the captured data. Captured data may be displayed on the input module 803 for further manipulation, encryption, storage, and or onward transmission.

For example, the optical device may detect a QR code 807 relating to the public key of a contact on the TTDM 804, and automatically capture the QR code 807 for storage and/or processing.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An auxiliary device for an electronic communication device, the auxiliary device comprising:
    an input domain comprising:
        an input module for entry of data by a user of the auxiliary device;
        a processor for processing data input by the user using the input module; and
        an encryption module configured to encrypt received data;
    an output domain comprising:
        an output module for outputting data to the user of the auxiliary device;
        a processor for processing received data for output by the output module; and
        a decryption module configured to decrypt received data; and
    a transmit domain configured to communicate encrypted data received from the input domain, via a first unidirectional data module, to the electronic communication device, wherein the first unidirectional data module prevents data communication from the transmit domain to the input domain; and
    a receive domain configured to communicate encrypted data received from the electronic communication device, via a second unidirectional data module, to the output domain, wherein the second unidirectional data module prevents data communication from the output domain to the receive domain.

2. The auxiliary device as in claim 1, wherein the unidirectional data modules are optocouplers.

3. The auxiliary device as in claim 1, wherein the unidirectional data modules comprises
    a data input;
    a data output; and
    a controller programmed to permit data transfer through the unidirectional data module from the data input to the data output and to forbid data transfer through the unidirectional data module from the data output to the data input.

4. The auxiliary device as in claim 1, wherein at least one of the input and output modules are implemented by a transparent touch display module.

5. The auxiliary device as in claim 1, wherein at least one of the encryption and decryption modules are implemented by a hardware security module.

6. The auxiliary device as in claim 1, wherein at least one of the transmit and receive domains comprise a wireless transceiver in communication with the electronic communication device.

7. The auxiliary device as in claim 6, wherein the wireless transceiver is configured to communicate using Bluetooth, Wi-Fi, IrDA, or NFC.

8. The auxiliary device as in claim 1, wherein at least one of the transmit and receive domains comprise a wired connection to the electronic communication device.

9. The auxiliary device as in claim 8, wherein the wired connection is via a flexible printed circuit.

10. The auxiliary device as in claim 1, wherein the input module comprises an optical device capable of optically receiving information.

11. The auxiliary device as in claim 10, wherein the optical device is positioned on the underside of the input module such that it can capture the display of the output module.

12. The auxiliary device as in claim 1, wherein the auxiliary device comprises a noise generator.

13. The auxiliary device as in claim 12, wherein the noise generator is configured to generate ultrasonic noise in the range 19 kHz-25 kHz.

14. The auxiliary device as in claim 1, wherein the auxiliary device features a bypass mechanism, interposed between the input domain and output domain, having a user interface allowing a user to redirect data received at the input domain directly to the output domain, bypassing the electronic communication device.

15. The auxiliary device as in claim 14, wherein the user interface is a spring-loaded switch.

16. The auxiliary device as in claim 1, wherein the input module is mounted onto a hinged support unit such that it can be stowed whilst not in use and rotated into proximity with the screen of the electronic communication device for usage.

17. The auxiliary device as in claim 1, wherein the input module is housed in a cylindrical retraction unit such that it can be stowed whilst not in use and unrolled for usage, wherein the cylindrical retraction unit is housed within the body of the auxiliary device.

18. The auxiliary device as in claim 1, wherein the electronic communication device is a smartphone.

19. A system comprising an auxiliary device and an electronic communication device,
    the auxiliary device comprising:
        an input domain comprising:
            an input module for entry of data by the user of the auxiliary device;
            a processor for processing data input by the user using the input module; and
            an encryption module configured to encrypt received data;
        an output domain comprising:
            an output module for outputting data to the user of the auxiliary device;
            a processor for processing received data for output by the output module; and
            a decryption module configured to decrypt received data; and
        a transmit domain configured to communicate encrypted data received from the input domain, via a first unidirectional data module, to the electronic communication device, wherein the first unidirectional data module prevents data communication from the transmit domain to the input domain; and a receive domain configured to communicate encrypted data received from the electronic communication device, via a second unidirectional data module, to the output domain, wherein the second unidirectional data module prevents data communication from the output domain to the receive domain.

20. The system of claim 19, wherein the electronic communication device is a smartphone.

\* \* \* \* \*